(12) United States Patent
Dirac et al.

(10) Patent No.: US 10,257,275 B1
(45) Date of Patent: Apr. 9, 2019

(54) TUNING SOFTWARE EXECUTION ENVIRONMENTS USING BAYESIAN MODELS

(71) Applicant: Amazon Technologies, Inc., Seattle, WA (US)

(72) Inventors: Leo Parker Dirac, Seattle, WA (US); Rodolphe Jenatton, Berlin (DE)

(73) Assignee: Amazon Technologies, Inc., Seattle, WA (US)

(*) Notice: Subject to any disclaimer, the term of this patent is extended or adjusted under 35 U.S.C. 154(b) by 602 days.

(21) Appl. No.: 14/923,237

(22) Filed: Oct. 26, 2015

(51) Int. Cl.
H04L 29/08 (2006.01)
G06N 5/02 (2006.01)

(52) U.S. Cl.
CPC ........... *H04L 67/1097* (2013.01); *G06N 5/02* (2013.01)

(58) Field of Classification Search
CPC .................................................. H04L 67/1097
See application file for complete search history.

(56) References Cited

U.S. PATENT DOCUMENTS

| | | | |
|---|---|---|---|
| 6,230,131 B1 | 5/2001 | Kuhn et al. | |
| 6,408,290 B1 | 6/2002 | Thiesson et al. | |
| 6,681,383 B1 | 1/2004 | Pastor et al. | |
| 6,804,691 B2 | 10/2004 | Coha et al. | |
| 7,328,218 B2 | 2/2008 | Steinberg et al. | |
| 8,229,864 B1 | 7/2012 | Lin et al. | |
| 8,370,280 B1 | 2/2013 | Lin et al. | |
| 8,463,071 B2 | 6/2013 | Snavely et al. | |
| 8,499,010 B2 | 7/2013 | Gracie et al. | |
| 8,510,238 B1 | 8/2013 | Aradhye et al. | |
| 8,886,576 B1 | 11/2014 | Sanketi et al. | |
| 9,020,861 B2 | 4/2015 | Lin et al. | |
| 9,069,737 B1 | 6/2015 | Kimotho et al. | |

(Continued)

FOREIGN PATENT DOCUMENTS

| | | |
|---|---|---|
| CN | 102622441 | 8/2012 |
| CN | 104123192 | 10/2014 |

(Continued)

OTHER PUBLICATIONS

Vanhatalo et al, "GPstuff: Bayesian Modeling with Gaussian Processes", 2013, Journal of Machine Learning Research 14, p. 1175-1179. (Year: 2013).*

(Continued)

*Primary Examiner* — Viet D Vu
(74) *Attorney, Agent, or Firm* — Robert C. Kowert; Meyertons, Hood, Kivlin, Kowert & Goetzel, P.C.

(57) ABSTRACT

An optimizer for a software execution environment determines an objective function and permitted settings for various tunable parameters of the environment. To represent the execution environment, the optimizer generates a Bayesian optimization model employing Gaussian process priors. The optimizer implements a plurality of iterations of execution of the model, interleaved with observation collection intervals. During a given observation collection interval, tunable parameter settings suggested by the previous model execution iteration are used in the execution environment, and the observations collected during the interval are used as inputs for the next model execution iteration. When an optimization goal is attained, the tunable settings that led to achieving the goal are stored.

21 Claims, 10 Drawing Sheets

(56) References Cited

U.S. PATENT DOCUMENTS

| | | | |
|---|---|---|---|
| 9,380,032 | B2 | 6/2016 | Resch et al. |
| 2005/0097068 | A1 | 5/2005 | Graepel et al. |
| 2005/0119999 | A1 | 6/2005 | Zait et al. |
| 2007/0185896 | A1 | 8/2007 | Jagannath et al. |
| 2008/0033900 | A1 | 2/2008 | Zhang et al. |
| 2010/0100416 | A1 | 4/2010 | Herbrich et al. |
| 2010/0223211 | A1 | 9/2010 | Johnson et al. |
| 2010/0262568 | A1 | 10/2010 | Schwaighofer et al. |
| 2011/0185230 | A1 | 7/2011 | Agrawal et al. |
| 2011/0313953 | A1 | 12/2011 | Lane et al. |
| 2011/0320767 | A1 | 12/2011 | Eren et al. |
| 2012/0054658 | A1 | 3/2012 | Chuat et al. |
| 2012/0089446 | A1 | 4/2012 | Gupta et al. |
| 2012/0158791 | A1 | 6/2012 | Kasneci et al. |
| 2012/0191631 | A1 | 7/2012 | Breckenridge et al. |
| 2013/0080641 | A1* | 3/2013 | Lui ..................... H04L 67/10 709/226 |
| 2013/0318240 | A1 | 11/2013 | Hebert et al. |
| 2013/0346347 | A1 | 12/2013 | Patterson et al. |
| 2014/0122381 | A1 | 5/2014 | Nowozin |
| 2015/0379072 | A1 | 12/2015 | Dirac et al. |
| 2015/0379423 | A1 | 12/2015 | Dirac et al. |
| 2015/0379424 | A1 | 12/2015 | Dirac et al. |
| 2015/0379425 | A1 | 12/2015 | Dirac et al. |
| 2015/0379426 | A1 | 12/2015 | Steele et al. |
| 2015/0379427 | A1 | 12/2015 | Dirac et al. |
| 2015/0379428 | A1 | 12/2015 | Dirac et al. |
| 2015/0379429 | A1 | 12/2015 | Lee et al. |
| 2015/0379430 | A1 | 12/2015 | Dirac et al. |
| 2016/0026720 | A1 | 1/2016 | Lehrer et al. |

FOREIGN PATENT DOCUMENTS

| | | |
|---|---|---|
| CN | 104536902 | 4/2015 |
| EP | 2393043 | 7/2011 |
| JP | 2009282577 | 12/2009 |
| WO | 2012151198 | 11/2012 |

OTHER PUBLICATIONS

U.S. Appl. No. 14/460,163, filed Aug. 14, 2014, Zuohua Zhang.
U.S. Appl. No. 14/489,448, filed Sep. 17, 2014, Leo Parker Dirac, et al.
U.S. Appl. No. 14/460,312, filed Aug. 14, 2014, Leo Parker Dirac, et al.
U.S. Appl. No. 14/318,880, filed Jun. 30, 2014, Leo Parker Dirac, et al.
U.S. Appl. No. 14/319,902, filed Jun. 30, 2014, Leo Parker Dirac, et al.
U.S. Appl. No. 14/460,314, filed Aug. 14, 2014, Leo Parker Dirac, et al.
U.S. Appl. No. 15/060,439, filed Mar. 3, 2016, Saman Zarandioon, et al.
U.S. Appl. No. 15/132,959, filed Apr. 19, 2016, Pooja Ashok Kumar, et al.
U.S. Appl. No. 14/990,161, filed Jan. 7, 2016, Gourav Roy, et al.
U.S. Appl. No. 14/990,171, filed Jan. 7, 2016, Gourav Roy, et al.
Soren Sonnenburg, et al., "The Shogun Maching Learning Toolbox," Journal of Machine Learning Research, Jan. 1, 2010, pp. 1799-1802, XP055216366, retrieved from http://www.jmlr.org/papers/volume11/sonnenburg10a/sonnenburg10a.pdf., pp. 1-4.
Anonymous: "GSoC 2014 Ideas," Internet Citation, Jun. 28, 2014, XP882745876, Retrieved from http://web.archive.org/web/20140628051115/http://shogun-toolbox.org/page/Events/gsoc2014ideas [retrieved on Sep. 25, 2015] Section "Shogun cloud extensione"; pp. 1-5.
Anonymous: "Blog Aug. 21, 2013", The Shogun Machine Learning Toolbox, Aug. 21, 2013, XP002745300, Retrieved from http://shogun-toolbox.org/page/contact/irclog/2013-08-21/, [retrieved on 2815-18-81], pp. 1-5.
Pyrathon D.: "Shogun as a SaaS", Shogun Machine Learning Toolbox Mailing List Archive, Mar. 4, 2014, XP882745382, Retrieved from http://comments.gmane.org/gmane.comp.ai.machine-learning.shogun/4359, [retrieved on 2815-18-81], pp. 1-3.
Yu, H-F, et al., "Large linear classification when data cannot fit in memory", ACM Trans. on Knowledge Discovery from Data (TKDD), vol. 5, No. 4, 2012, 23 Pages.
Soroush, E. et al., "ArrayStore: a store manager for complex parallel array processing", Proc. of the 2011 ACM SIGMOD Intrl. Cont on Management of Data, ACM, pp. 253-264.
Esposito, et al., "A Comparative Analysis of Methods for Pruning Decision Trees", 1997, IEEE, 0162-8828/97, pp. 476-491.
Golbandi, et al., "Adaptive Bootstrapping of Recommender Systems Using Decision Trees", 2011, WSDM, pp. 595-604.
Goldstein, et al., Penalized Split Criteria for Interpretable Trees, The Wharton School, University of Pennsylvania, 2013, pp. 1-25.
Zhan, et al., The State Problem for Test Generation in Si mu link, GECC0'06, Jul. 8-12, 2006, pp. 1941-1948.
The MathWorks, Inc., Simulink Projects Source Control Adapter Software Development Kit, SOK Version 1.2 for R2013b, Mar. 2013, pp. 1-9.
Adomavicius et al., "Context-Aware Recommender Systems", AI Magazine, Fall 2011, pp. 67-80.
Beach, et al., "Fusing Mobile, Sensor, and Social Data to Fully Enable Context-Aware Computing", Hotmobile 2010, ACM, pp. 1-6.
Baltrunas, et al., "Context Relevance Assessment for Recommender Systems", IUI 11, Feb. 13-16, 2011, ACM, pp. 1-4.
International Search Report and Written Opinion from PCT/US2015/038610, dated Sep. 25, 2015, Amazon Technologies, Inc., pp. 1-12.
Kolo, B., "Binary and Multiclass Classification, Passage", Binary and Multiclass Classification, XP002744526, Aug. 12, 2010, pp. 78-80.
Gamma, E., et al., "Design Patterns, Passage", XP002286644, Jan. 1, 1995, pp. 293-294; 297, 300-301.
International Search Report and Written Opinion from PCT/US2015/038589, dated Sep. 23, 2015, Amazon Technologies, Inc., pp. 1-12.
U.S. Appl. No. 15/436,442, filed Feb. 17, 2017, Cédric Philippe Archambeau et al.
U.S. Appl. No. 14/463,434, filed Aug. 19, 2014, Robert Matthias Steele, et al.
U.S. Appl. No. 14/569,458, filed Dec. 12, 2014, Leo Parker Dirac, et al.
U.S. Appl. No. 14/489,449, filed Sep. 17, 2014, Leo Parker Dirac, et al.
U.S. Appl. No. 14/484,201, filed Sep. 11, 2014, Michael Brueckner, et al.
U.S. Appl. No. 14/538,723, filed Nov. 11, 2014, Polly Po Yee Lee, et al.
Eric Brochu, et al., "A Tutorial on Bayesian Optimization of Expensive Cost Functions, with Application to Active User Modeling and Hierarchical Reinforcement Learning", arX1v:1012.2599v1, Dec. 14, 2010, pp. 1-49.
Jasper Snoek, et al., "Practical Bayesian Optimization of Machine Learning Algorithms", arXiv:1206.2944v2 [stat.ML] Aug. 29, 2012, pp. 1-12.
AWS, "Amazon Machine Learning Developer Guide", 2015, pp. 1-133.
Michael A. Osborne, et al., "Gaussian Processes for Global Optimization", Published in the 3rd International Conference on Learning and Intelligent Optimization, 2009, pp. 1-15.

* cited by examiner

TUNING SOFTWARE EXECUTION ENVIRONMENTS USING BAYESIAN MODELS

BACKGROUND

In recent years, more and more software applications are being run in distributed, multi-tier execution environments, often using resources of a provider network or public cloud environment. For example, an application which exposes web-based interfaces to customers around the world, such as an e-retail application or an e-banking application, may be run continuously using provider network resources, with the pools of computing, storage and networking resources assigned to the application being dynamically re-sized as needed. In many cases, at least some of the costs of running the application may be proportional to the amount of resources that are consumed, such as the number of CPU-minutes used, the number of megabytes of network bandwidth consumed, and so on. In an increasingly competitive business environment, application owners may need to focus on improving the performance of such applications (e.g., to reduce the resources consumed per unit of revenue generated) without impacting client satisfaction levels.

Unfortunately, the performance of many applications, including applications that are run on relatively small execution platforms such as a single machine or a small set of machines, is frequently hard to tune. For example, even identifying the optimum (or at least near-optimum) garbage collection related parameters for single-machine applications written in some popular programming languages is a non-trivial task often left to experts. The relationships between the tunable parameters of many applications and targeted performance results such as throughput or response times are often complex, with small changes to one parameter sometimes resulting in large changes in the results. In some cases, the influence of a given tunable parameter on application performance may depend on the values selected for other tunable parameters.

Applications may sometimes utilize virtualized resources of a provider network (e.g., guest virtual machines instantiated at multi-tenant hardware hosts of a virtualized computing service), which may add layers of potential tuning choices over which the application owners have limited control. Some applications utilize multiple services of a provider network, such as database services, storage services and the like in addition to virtualized computing services, which can lead to a combinatorial explosion in the tunable values which may have to be considered. The problem of performance tuning becomes even less tractable in continuously-running execution environments, in which repeatable tuning-related experiments may be hard to perform, and in which the relationships between the tuning parameters and the execution results may themselves drift over time.

Figure 1:
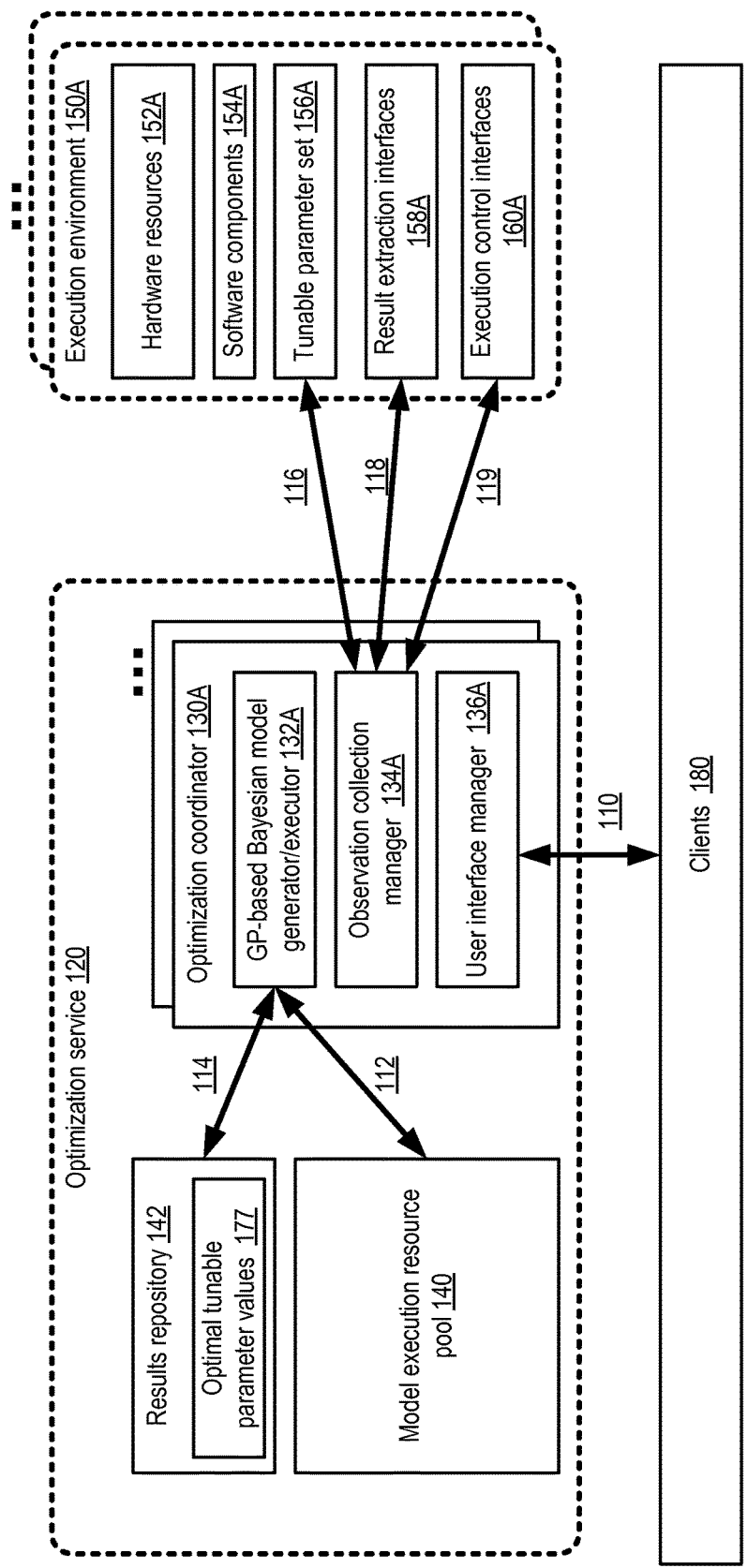
FIG. 1 illustrates an example system environment in which Bayesian optimization techniques utilizing Gaussian processes (GPs) may be employed to select tunable parameter settings, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for easy-to-use optimization tools which automatically generate and execute Bayesian optimization models with Gaussian process (GP) priors to help select tunable parameter values for software execution environments are described. Such optimization tools may be exposed to clients in a variety of ways in different embodiments. In some embodiments, the optimization tool may be packaged as a standalone program which can, for example, be run at a client's own computing resources or at any resources selected by the client. In other embodiments, the tool may be implemented as part of a hosted network-accessible optimization service implemented, for example, at a provider network, and clients may utilize the service via network endpoints established for the service. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks in this document. A provider network may also sometimes be referred to as a "public cloud" environment. In at least some embodiments, the optimization tool may be utilized in a "silent" mode discussed below in further detail, e.g., without necessarily revealing its use to clients whose application performance is being optimized. The phrase "GP-based Bayesian optimization" may be used herein as a shorter equivalent of the phrase "Bayesian optimization with Gaussian process priors".

Regardless of the manner in which the optimization tool is presented to clients, in various embodiments the clients may not be required to be experts in, or even be particularly familiar with, the statistics or mathematics involved in generating and executing the models. Instead, at least in some embodiments in which the client is aware that an optimization task is going to be performed, the client may simply specify or indicate various properties or characteristics of the software execution environment optimization target, the tunable parameters of interest, and/or constraints (if any) to be placed on the resources used for the optimization task itself. In other embodiments, in which the optimization may be performed without informing the client, the optimization tool may itself identify an execution environment comprising one or more software components as a candidate for performance optimization, and may also select various tunable parameters of the execution environment for which an attempt to identify optimal values is to be made.

The optimization tool may determine a definition of, or a formula for, an objective function which is to be maximized or minimized with respect to the optimization target execution environment in various embodiments. An objective function may be identified in various ways in different embodiments, e.g., based on input from the client or based on the types of applications being run. Objective functions may sometimes be referred to as "loss functions". While a number of different types of performance-related execution results (such as throughput, response times, consumed CPU-minutes, network bandwidth used, etc.) may be collected from the execution environment in some cases, a scalar objective function (an optimization objective expressible and computable as a single value) may be used in various embodiments for Bayesian optimization using Gaussian processes. The value of the objective function for a given observation collection interval may be calculated using a combination of raw execution results by the optimization tool in some embodiments. For example, an objective function such as "total cost in dollars" may be computed using a collection of raw metrics such as "CPU-minutes consumed", "network bandwidth used", "storage space used", in combination with cost metrics such as "dollars per CPU-minute", "dollars-per-megabyte-of-bandwidth", etc. In at least some embodiments the relationship between the objective function and the various metrics or execution results of the software and/or hardware components of the execution components may be nonlinear.

Having identified the objective function and the tunable parameters, the optimization tool may generate a Bayesian optimization model using Gaussian process (GP) priors to represent the execution environment to be optimized. Bayesian optimization is a strategy used for finding the extrema (minima or maxima, depending on the kind of objective functions being considered) of objective functions whose relationship with input parameters (e.g., tunable parameter settings in the case of software execution environments) is complex, especially in scenarios in which the evaluation of the objective function is an expensive endeavor. Bayesian optimization may, for example, be used effectively in environments in which a closed-form formula or equation for the objective function in terms of the input parameters is not available, but where it is possible to compute values for the objective function for some samples of input parameter value combinations. Bayesian optimization models incorporate prior belief about the problem (e.g., the collection of objective function values for already-sampled input parameter combinations) to help direct the sampling (i.e., the set of input parameter values to be sampled next), and to trade off exploration and exploitation of the search space. Such optimization models are called Bayesian because they are based on Bayes' theorem, which can be stated in a simplified form as the following: the posterior probability of a model (or theory, or hypothesis) M given evidence (or data, or observations) E is proportional to the likelihood of E given M multiplied by the prior probability of M.

In Bayesian optimization, the prior (which may be represented as a Gaussian process in various embodiments) represents a belief about the space of possible objective functions. Although the exact mathematical relationship between the input variables and the output variables of the system may not be known, Bayesian optimization techniques assume that the prior knowledge collected provides insights into some of the properties of the mathematical relationship, such as smoothness, and this makes some possible objective functions more plausible than others. To sample efficiently, Bayesian optimization techniques may use an acquisition function (e.g., a function determined internally by the optimization tool in various embodiments without requiring client input describing or specifying the function) to determine the next combination of input variable values to sample. The decisions made using acquisition functions represent tradeoffs between exploration (possible input variable value combinations where the objective function may be very uncertain) and exploitation (trying values of input variables where the objective function is expected to be near its desired extremum). Compared to at least some other optimization techniques, Bayesian optimization (e.g., using Gaussian processes as priors) may tend to minimize the number of distinct objective function evaluations required before the desired extremum is reached. Moreover, Bayesian optimization models have been shown to work well even in settings where the objective function has multiple local extrema.

A number of iterations of executions of the Bayesian model using GP priors may be performed in various embodiments, interleaved with iterations of execution results collection from the execution environment. The model input parameter value settings used for a given iteration may be based at least in part on the execution results (and the corresponding objective function value) obtained in the most recent collection of execution results from the execution environment, and the output model parameter values of the given iteration may be used to set the tunable parameter values for the next observation collection interval. In at least some embodiments, the optimization tool may determine the boundaries (e.g., start and end times) of the observation collection intervals as discussed below. The iterations of model execution and observation collection may be repeated until either the targeted extremum of the objective function has been attained (at least to within some tolerance limit), or until the resources available for the optimization task have been exhausted. The combination of tunable parameter settings that correspond to the attainment of the optimization goal (or the combination of tunable parameter settings that came closest to the optimization goal) may be stored in various embodiments, e.g., in a persistent storage repository accessible to the optimization tool and/or in a knowledge base.

In different embodiments, the extent of involvement of the optimization tool in the execution of the software components of the target optimization environment, and in the collection of the results from the target optimization environment, may vary. In some modes of operation, the optimization tool or service may determine when (e.g., over which specific periods) the results of executing the to-be-optimized applications are to be collected, and collect the results according to the schedule it selects. The optimization tool may even issue the commands to execute the applications from which the results are to be obtained. In other modes of operation, the optimization tool or service may provide recommended tuning parameter settings generated by the Bayesian optimization model to a different entity responsible for executing the software and/or collecting execution results (e.g., a different service, or the client at whose request the software is executed). In many scenarios, as described below, the optimization tool may be employed to tune execution environments in which experimental repeatability is hard to achieve: for example, it may not be easy or straightforward to control the arriving service requests being handled at a given production-level execution environment for a continuously-running service whose performance is to be optimized, so different observation collection intervals may correspond to different workload levels. Even for execution environments involving batch jobs, the underlying data sets for the batch jobs may change from one observation collection interval to another, thereby introducing workload variations between observations.

The extent of to which the clients on whose behalf the execution environment is configured influence or control the optimization tool's operations may also vary in different embodiments. In some embodiments, clients may not even be aware that optimization tasks are being performed for them; in contrast, in other embodiments as described below, the clients may provide detailed guidance regarding the manner in which the tunable parameters should be varied, hierarchical or conditional relationships between tunable parameters, validity periods for observations collected from the execution environments, and so on. The Bayesian optimization techniques described herein may be employed for identifying desirable settings for a wide variety of tunable parameters over a range of time scales—e.g., in some embodiments, the techniques may be used over months or even years for execution environments in which hundreds of tunable parameters may be modified, while in other embodiments, the techniques may be used to tune parameters of individual programs which typically take no more than an hour to run and have far smaller sets of tunable parameters.

Example System Environment

FIG. 1 illustrates an example system environment in which Bayesian optimization techniques utilizing Gaussian processes (GPs) may be employed to select tunable parameter settings, according to at least some embodiments. As shown, system 100 includes various resources of a network-accessible optimization service 120, including one or more optimization coordinators 130 (e.g., optimization coordinator 130A), a resource pool 140 for model execution, and a results repository 142. An optimization coordinator 130, which may be implemented at one or more computing devices, may represent one example of an optimization tool which orchestrates the selection of appropriate parameter settings for various execution environments 150. In a given execution environment such as 150A, a set of software components 154A may be executed using hardware resources (e.g., virtual or physical compute servers, storage devices, networking devices and the like) on behalf of one or more clients 180 of the optimization service 120.

An optimization coordinator 130A may identify a particular execution environment 150A as a candidate for performance optimization in the depicted embodiment. In some cases, the candidate may be specified by a client 180, e.g., via one or programmatic interactions 110 with the service. User interface manager 136A of the optimization coordinator 130A may be responsible for implementing any of a variety of programmatic interfaces accessible by clients 180, such as web-based consoles or web sites, APIs (application programming interfaces), command-line tools, graphical user interfaces and the like. In at least one embodiment, the optimization coordinator 130A may interact with other services at which the software components 154A are run, and/or at which the hardware resources 152A are managed, to identify potentially optimizable execution environments, without necessarily requiring direct input from clients 180. In some embodiments, a given optimization coordinator 13A0 may work on orchestrating the optimization of several different execution environments 150, e.g., either in parallel or sequentially. In other embodiments, an optimization coordinator 130A may be used for a single execution environment at a time. Execution environments such as 150A may also be referred to as "optimization targets" herein.

With respect to a given execution environment 150A, the optimization coordinator 130A may determine a tunable parameter set 156A, execution result interaction interfaces 158A, and/or execution control interfaces 160A in the depicted embodiment. A wide variety of parameters may be tuned in different embodiments and for different execution environments. In some environments 150 the tuning parameters may include, for example, the number of nodes of a cluster of software or hardware components to be configured for a particular distributed application, the manner in which sub-tasks of the distributed application are to be mapped to the different nodes, garbage collection algorithms to be used for memory management, minimum or maximum sizes of the heaps to be managed using the garbage collection algorithms, database buffer sizes, the conditions which are to trigger transfers of application data from one type of memory to another (e.g., from volatile memory to disks or vice versa), virtualization-related parameters at the hypervisor level, networking flow control parameters, and so on. Corresponding to each tunable parameter of set 156A, the optimization coordinator may identify respective ranges or enumerations of permitted values in the depicted embodiment.

The optimization coordinator tool 130A may also determine how the objective function which is to be optimized for the execution environment 150A is to be calculated, e.g., based on some combination of execution results obtainable using the results extraction interfaces 158A and/or on other metadata such as resource pricing models. The optimization goal—e.g., whether the objective function is to be maximized or minimized—may also be determined by the optimization coordinator 130A. In one embodiment, the software components 154A and/or monitoring tools of the execution environment may store execution results for an observation collection period into one or more result files or logs. In such a scenario, observation collection manager 134A of optimization coordinator 130A may simply examine the result files or logs (as indicated by arrow 118), extract the results on which the objective function depends, and generate a value of the objective function based on a formula or definition provided by a client 180 or by some other entity associated with the execution environment. In the depicted embodiment, the optimization coordinator 130A may set one or more tunable parameters (as indicated by arrow 116) and use utilize execution control interfaces 160A (e.g., executable scripts or web service request interfaces) to run software components 154A. In some embodiments, the optimization coordinator may not control the scheduling of the execution of the software components—e.g., the software components may be run continuously, and the optimization coordinator may extract execution results periodically. In one embodiment, the execution results and/or the value of the objective function for a given observation collection interval or iteration may be provided to the optimization coordinator by a client 180. In at least some embodiments, the optimization coordinator 130A may provide suggested tuning parameter values to a client 180 or to an application controller of the execution environment, instead of setting the tuning parameter values itself.

The optimization coordinator 130A may include a model generator/executor subcomponent 132A, responsible for generating a Bayesian optimization model which uses Gaussian process priors. The model generator/executor 132A may collaborate with the observation collection manager 134A to perform one or more iterations of model execution in the depicted embodiment using resources of pool 140 (as indicated by arrow 112), e.g., interleaved with respective iterations of software component executions at the execution environment 150A. The results obtained from a given period or observed interval of software execution at execution environment 150A may be used to derive the input parameters of the next iteration of model execution, for example, and the results or output parameters of the model execution iteration may indicate the tunable parameter settings of the next observed interval of software execution. At the end of each observed interval, the objective function may be computed and a determination may be made as to whether the optimization goal has been reached. If the optimization goal is reached, the tunable parameter settings which resulted in the attainment of the goal may be designated as optimal tunable parameter values 177 and stored in repository 142 in the depicted embodiment, as indicated by arrow 114. In embodiments in which the software components continue running after the optimal tunable parameters are found, the optimal settings may remain in effect at the execution environment 150A. In at least some embodiments, constraints may be enforced on the time or resources which can be used for identifying tuning parameter settings for a given execution environment such as 150A, and it may be the case that the optimization coordinator exhausts the available resources or available time without identifying the optimal parameter settings. In various embodiments, records of the intermediate results (e.g., the objective function values corresponding to respective sets of tunable parameter settings recommended or used by the optimization coordinator) of the optimization procedure may also be stored in repository 142. Such intermediate results may serve, for example, as a knowledge base for later optimization attempts. In at least one embodiment, an indication of the optimal parameter settings may be provided to the client 180 whose execution environment was the subject of the optimization.

In at least some embodiments, the execution environment 150A may remain in use over long periods of time, and the particular combination of parameter settings which lead to the maximization or minimization of the objective functions may not remain fixed over the lifetime of the execution environment. In such embodiments, the Bayesian optimization procedure may be repeated periodically, and tunable parameter settings may be adjusted accordingly.

Relationships Between Tunable Parameters and Objective Functions

Figure 2:
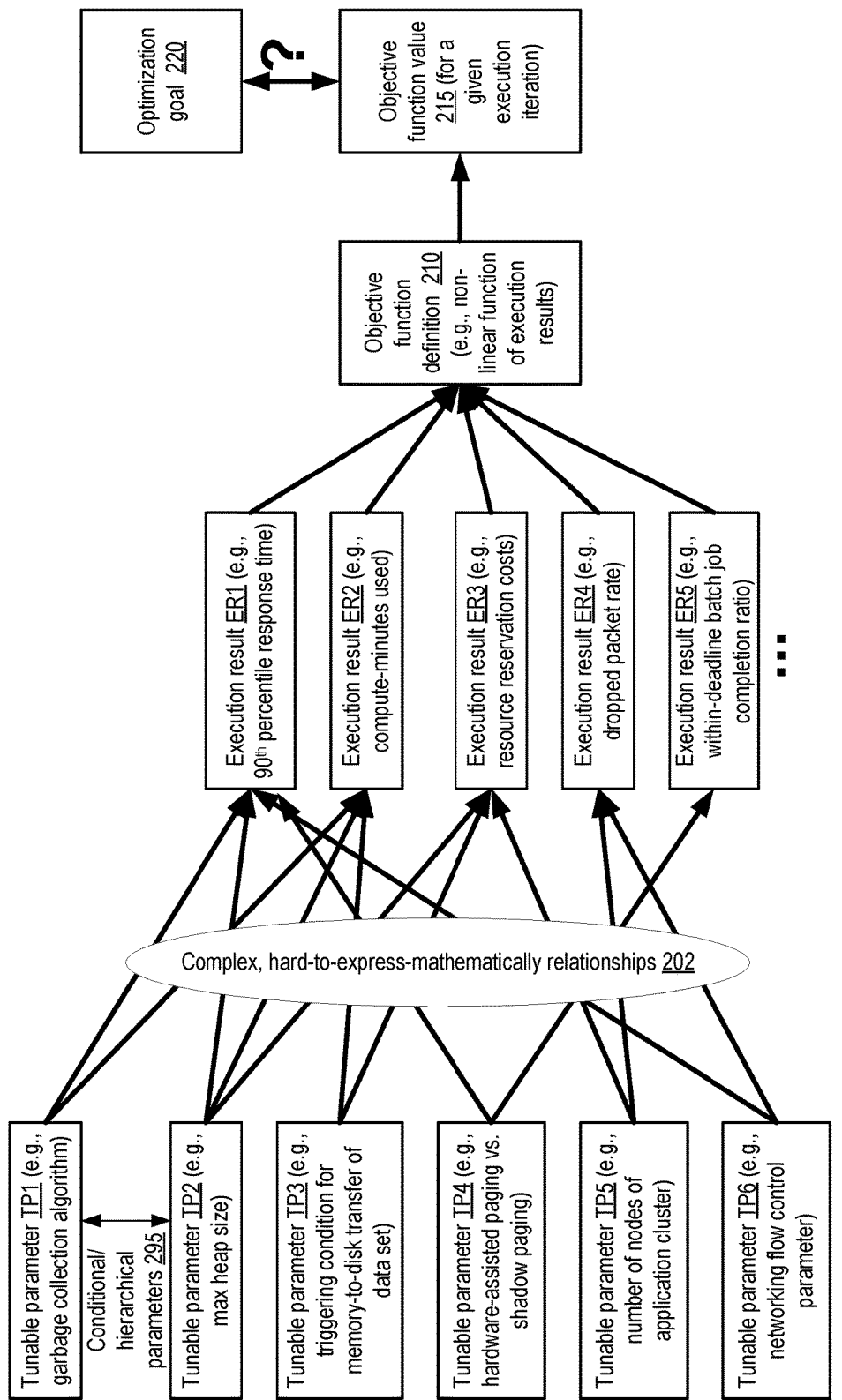
FIG. 2 illustrates examples of tunable parameters and execution results of an optimization target environment, with an objective function defined based on a plurality of the execution results, according to at least some embodiments.

Many applications today may have a very large number of tunable parameters, and the tunable parameters may affect application execution results in non-trivial ways. FIG. 2 illustrates examples of tunable parameters and execution results of an optimization target environment, with an objective function defined based on a plurality of the execution results, according to at least some embodiments. Six examples TP1-TP6 of tunable parameters which may apply to different subcomponents of an execution environment are shown. TP1 governs the particular garbage collection algorithm (e.g., similar to various algorithms used for Java™ virtual machines, such as concurrent-mark-and-sweep or parallel garbage collection) to be used for memory management of one or more software programs used in the optimization target execution environment. TP2 indicates the maximum heap size for a memory heap instantiated for a software program whose garbage collection algorithm is controlled by TP1. The effect of a selected TP2 setting (or even the allowable settings for TP2) may depend on the setting chosen for TP1. As suggested by the example of TP1 and TP2 and indicated by arrow 295, in various embodiments some subset of tunable parameters may have hierarchical or conditional relationships with respect to others. In at least one implementation, a client may indicate hierarchical or conditional relationships between various tunable parameters to the optimization tool, and one or more model parameters or internal elements of the model, such as elements of the co-variance matrix of the Gaussian process, may be set to reflect the relationships between the tunable parameters.

Tuning parameter TP3 indicates a triggering condition to be used to decide when (i.e., under what conditions) a particular data set being processed in volatile memory at a particular software component should be transferred to disk. Settings for such parameters, which may be used in some types of parallel processing applications such as "big data" applications, may strongly influence response times and/or throughput. Tuning parameter TP4 governs the kind of paging to be used at a hypervisor of a virtualization host, e.g., at a virtual computing service whose resources are used to execute at least some of the software components of the optimization target execution environment. A number of different paging techniques may be available in various embodiments, e.g., based on the hardware architecture of the virtualization hosts being used, such as so-called shadow paging or hardware-assisted paging. Tuning parameter TP5 is used to specify the number of nodes (e.g., software process instances and/or hardware hosts) which are to be used for an application cluster in the optimization target environment. As exemplified by TP5, some tuning parameters may influence the number, type or amount of hardware resources deployed at the execution environment; that is, the tunable parameters may not necessarily be limited to software-only settings. TP6 is a networking flow control parameter defined in the particular communication protocol being used (e.g., a protocol of the TCP/IP or Transmission Control Protocol/Internet Protocol family) for traffic between various components of the execution environment and/or between the execution environment and clients of the applications being implemented in the execution environment. It is noted that the tunable parameters TP1-TP6 are provided as examples of the different types of adjustments that can be made to influence performance at various levels of software applications and the platforms used for the applications, and is not intended to limit the applicability of the Gaussian process based Bayesian optimization techniques.

A number of examples of execution results (ERs) which may be collected from the execution environment are shown in FIG. 2. As indicated by the arrows 202 between the tunable parameters and the execution results, the tuning parameters may affect the execution results in complicated ways, which may typically be hard to express using closed-form mathematical formulas or equations. Depending on the setting of one tunable parameter, for example, the effect of another tunable parameter on one or more of the execution results may dramatically increase (or decrease) in some cases. Execution result ER1 is the $90^{th}$ percentile response time for individual service requests handled at the execution environment—e.g., the response time below which 90 percent of requests are fulfilled. ER2 is a measure of compute-minutes—e.g., the number of minutes of CPU usage or processing core usage at the execution environment to handle a particular workload. In embodiments in which resources of a provider network are being used for the software components, and at least some of the resources have fixed up-front reservation costs associated with them, such reservation costs may represent another execution result ER3. ER4 is a measure of the rate at which network packets are dropped at one or more components of the execution environment, while ER5 is a metric indicating the fraction of a batch jobs which are completed within corresponding job deadlines. As suggested by the inclusion of ER1 and ER5, different components of the execution environment may run in respective modes—e.g., some software components may respond to application requests received from clients, in which case response times may be relevant metrics of performance, while other software components may be used for background or batch jobs, in which case the durations of the batch jobs may be relevant metrics.

In order to employ Bayesian optimization techniques of the kind discussed earlier, the different execution results may have to be mapped or transformed into a single objective function value 215. In some embodiments the objective function definition 210 (which may be specified by clients on whose behalf the execution environment is established, or by domain experts) may indicate non-linear relationships between one or more of the execution results and the quantity which designated the objective function. Respective objective function values 215 may be computed for each iteration of model execution and the corresponding software component executions, and a determination may be made after each iteration as to whether the optimization goal 220 (e.g., the maximization or minimization of the objective function) has been met.

Optimizing Continuously-Running Applications

Figure 3:
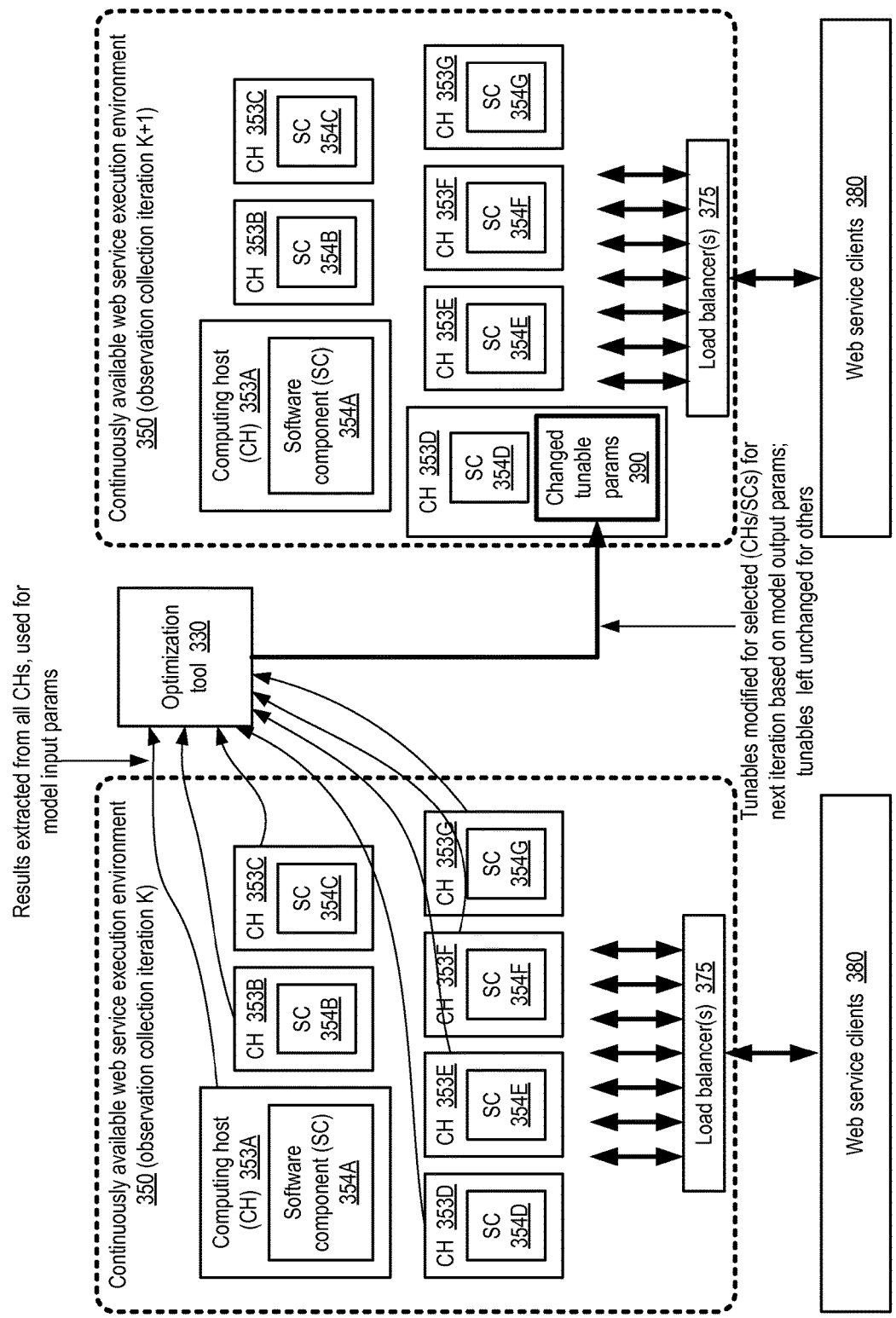
FIG. 3 illustrates an example of a use of GP-based Bayesian optimization at a distributed web service execution environment, in which tuning parameters of a given node of the service may be modified while leaving parameters of other nodes unchanged, according to at least some embodiments.

Unlike in some laboratory-based optimization scenarios in which observations can be collected using repeatable experiments, in at least some embodiments it may be difficult to control various aspects of the execution environment completely. As a result, successive observations used for the optimization model may be obtained in somewhat different operating conditions, with less-than-perfect repeatability with respect to earlier observations. FIG. 3 illustrates an example of a use of GP-based Bayesian optimization at a distributed web service execution environment, in which tuning parameters of a given node of the service may be modified while leaving parameters of other nodes unchanged, according to at least some embodiments. In the continuously-available web service execution environment 350 shown in FIG. 3, service requests from clients 380 of the web service are farmed out to various software components 354 (e.g., 354A-354G) by one or more load balancers 375. The requests (and corresponding responses) may be formatted in HTTP (Hypertext Transfer Protocol), HTTPs (secure HTTP), SOAP (Simple Object Access Protocol), or in any other desired web service protocol. In some embodiments, a stateless protocol based on the REST (representational state transfer) architecture may be used for the service requests. Each software component 354 runs on a respective computing host 353 in the illustrated scenario. A respective collection of tunable parameters may be set for each of the combinations of computing hosts 353 and software components 354. Functionally, each of the software components 354 may be equivalent to the others, but the performance results achieved at any given one of the software components may depend at least in part on the tunable parameter settings used for that particular software component or its host 353. In at least some cases, some or all of the computing hosts 253 may have the same native performance capabilities (e.g., the same processors, memory and storage resources may be used at different hosts).

In the embodiment depicted in FIG. 3, optimization tool 330 may collect respective execution results from each of the computing hosts 353 with respect to a particular observation collection iteration K. The optimization tool may process the collected results (e.g., by computing the objective function), and use the processed results to perform the next iteration of the GP-based Bayesian model. The model's output parameters may indicate recommended tunable parameter settings to be used for the next observation collection iteration (iteration (K+1)). Instead of modifying the parameters at all the software components 354, parameters of only a selected subset of components may be modified for iteration (K+1) in the depicted embodiment. For example, changed tunable parameters 390 may only be used for software component 354D at compute host 353D, while the parameters for all the other hosts and software components may be left unchanged. This approach of changing parameters at a small subset of the execution environment may have the advantage that if the modified parameters happen to have a negative impact on the objective function, the relative negative impact would tend to be lower than if parameters for all the software components were modified for iteration (K+1). Furthermore, if the modification of the parameters 390 requires pausing or restarting the affected compute host 354D, the clients 380 would typically not be expected to notice the effects of the pausing or restarting, since their service requests would automatically be redistributed among the remaining hosts and software components.

Figure 4:
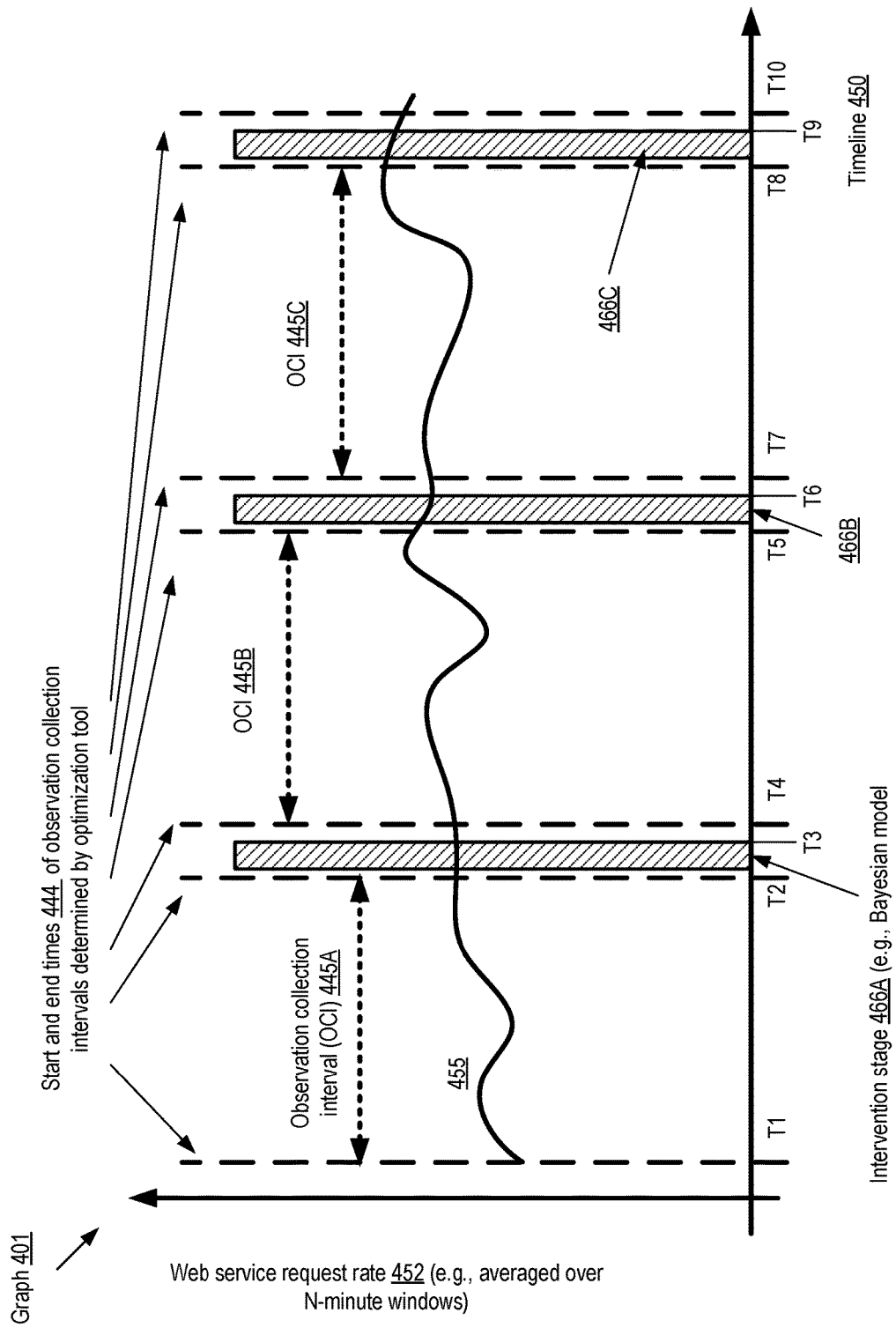
FIG. 4 illustrates an example timeline for GP-based Bayesian optimization at a distributed web service execution environment, according to at least some embodiments.

FIG. 4 illustrates an example timeline for GP-based Bayesian optimization at a distributed web service execution environment, according to at least some embodiments. The X-axis of graph 401 represents time, and the Y-axis represents the rate at which service requests are received and processed, averaged over successive time intervals of N minutes each. Curve 455 illustrates the changing service request rate over a time period from T1 to T10. The optimization tool which performs GP-based Bayesian optimization for the service determines or selects the start and end times 444 of observation collection intervals (OCIs) 445 in the depicted embodiment. For example, OCI 445A starts at T1 and ends at T2, OCI 445B starts at T4 and ends at T5, and OCI 445C starts at T7 and ends at T8. In some embodiments, the operator or administrator of the web service may recommend OCI durations or specific start and end times for the OCIs to the optimization tool. In other embodiments, the optimization tool may select (e.g., at random) the boundaries of a few initial observation intervals, collect execution results for those intervals and perform the corresponding initial iterations of the Bayesian model, and adjust the length of the OCIs based on the results achieved thus far. Each OCI 445 may be followed by a corresponding intervention stage 466 in the depicted embodiment, such as intervention stage 466A after OCI 445A and intervention stage 466B after OCI 445B. During the intervention stage 466, an iteration of the Bayesian model (with model parameters based at least in part on the execution results obtained from the immediately previous OCI) may be performed, and recommended changes to tuning parameters may be identified. The recommended changes may be applied to at least a subset of the service's software execution platforms (such as selected CH 353D in the example shown in FIG. 3), and the next OCI may then be begun with the newly-applied parameters. It is noted that although the intervention phases do not overlap with the OCIs in FIG. 4, in at least some embodiments model executions and/or parameter setting modifications may be performed in parallel with OCIs. It is also noted that the durations of the OCIs relative to the intervention phases shown in FIG. 4 are not intended to be restrictive with respect to any particular implementations. That is, the fraction of time taken to run the model iteration and apply the parameters recommended by the model, relative to the time taken for an observation collection interval, may differ in various embodiments from that suggested in FIG. 4. In at least some embodiments, especially in scenarios such as those illustrated in FIG. 3 and FIG. 4, where the underlying workload changes over time, it may be difficult to determine when truly optimal values have been identified for the execution environment (and in some cases, the optimal values may change with the workload level, so identifying a single set of optimal values may be impossible). In such scenarios, iterations of GP-based optimization may be performed on a continuing basis, e.g., as long as resources for the optimization-related operations remain available.

Optimizing Batch-Mode Applications

Figure 5:
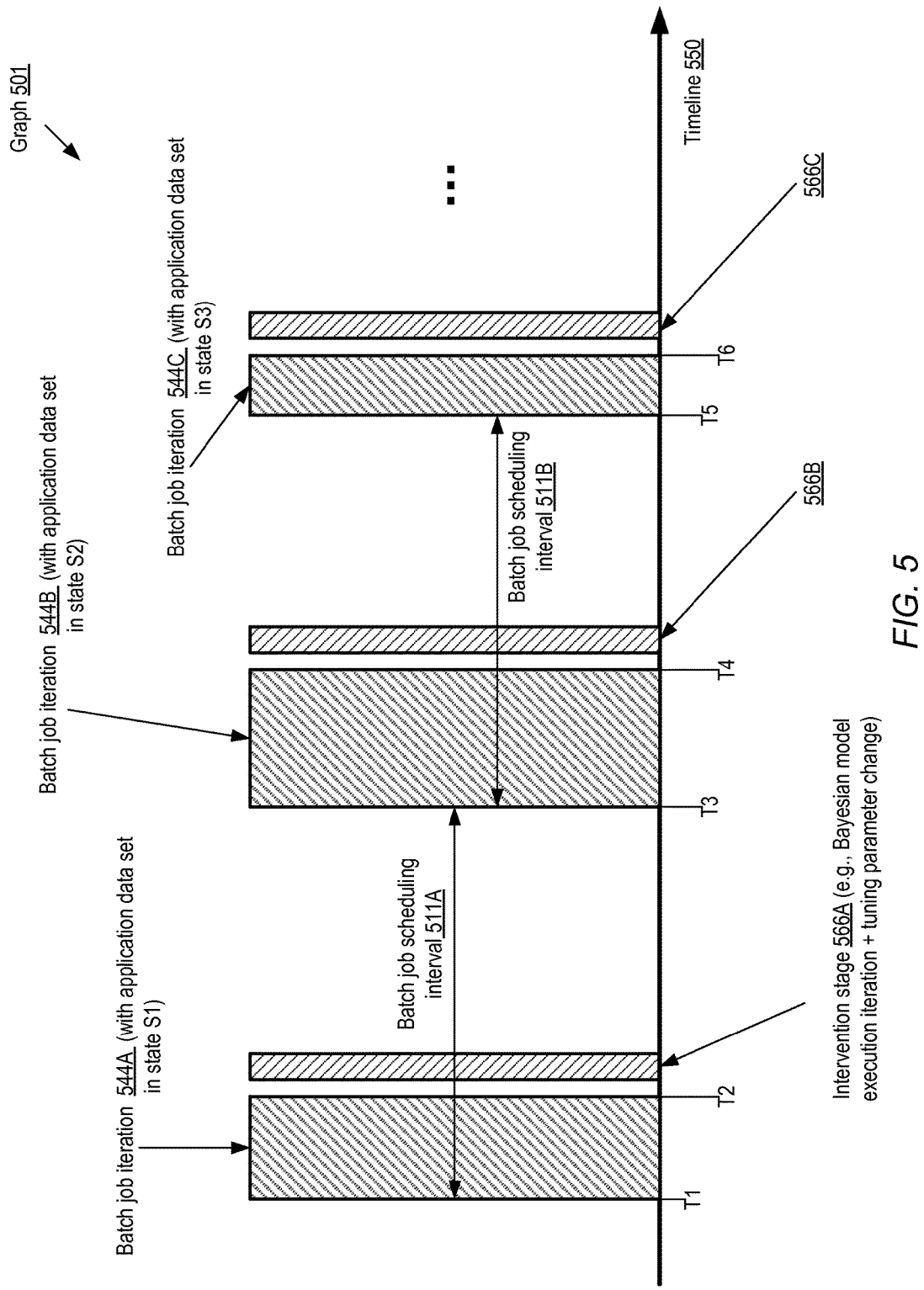
FIG. 5 illustrates an example of a use of GP-based Bayesian optimization for a batch-mode application, according to at least some embodiments.

In some embodiments, the tunable parameter selection techniques described above may be employed for applications that are run periodically rather than in the continuous manner discussed with respect to FIG. 3 and FIG. 4. FIG. 5 illustrates an example of a use of GP-based Bayesian optimization for a batch-mode application, according to at least some embodiments. Respective iterations 544 of the application are started at regular intervals along timeline 550 in the depicted scenario. For example, iteration 544A begins at time T1 and lasts until T2, iteration 544B begins at T3 and lasts until T4, and iteration 544C begins at T5 and ends at T6. At least in some cases the set of physical and/or virtual machines of the application's execution environment may be identical for each iteration 544, and the software components being executed may also be identical. The batch job scheduling intervals 511A and 511B may be approximately (or exactly) equal to each other, but the durations of the application execution iterations (e.g., (T2-T1), (T4-T3), and (T6-T5)) may differ from each other. For example, if the application comprises a nightly analysis on the sales and customer browsing behavior of a large e-retail site, respective iterations of the application may be scheduled starting at 1 AM each night in a particular time zone, and may take different amounts of time based on a number of factors. The state of the underlying data set which is being analyzed may change for each iteration, for example. The data set for the batch-mode application may be in state S1 at time T1, a different state S2 at time T2, and a third different state S3 at time T3 in the example shown in FIG. 5.

Each iteration 544 of the batch-mode application may result in a collection of a set of observations used for the next iteration of execution of the GP-based model being used for optimization in the depicted embodiment, as indicated by the intervention stages 566A-566C. Execution results pertaining to the batch-mode application, such as the time taken to complete the application run, the amount of memory, storage or computation resource consumed, and the like, may be used to determine the value of the objective function for the observed iteration. The input parameters of the GP-based model may be adjusted based on the results of the application execution, and the results of the next iteration of the model may be used to modify one or more tunable parameter settings for the next application iteration. It is noted that even though the same application logic may be executed for each application iteration 544 using the same hardware, the repeatability of the observed environment may still be less than perfect in the scenario depicted in FIG. 5, e.g., because of the changes in the application's data set between iterations. As in the case of the continuously-running service environment discussed in the context of FIG. 3 and FIG. 4, the GP-based Bayesian model may converge on optimal tunable parameter settings in relatively few iterations despite the lack of perfect repeatability in batch-mode environments such as that illustrated in FIG. 5.

Silent Optimization

Figure 6:
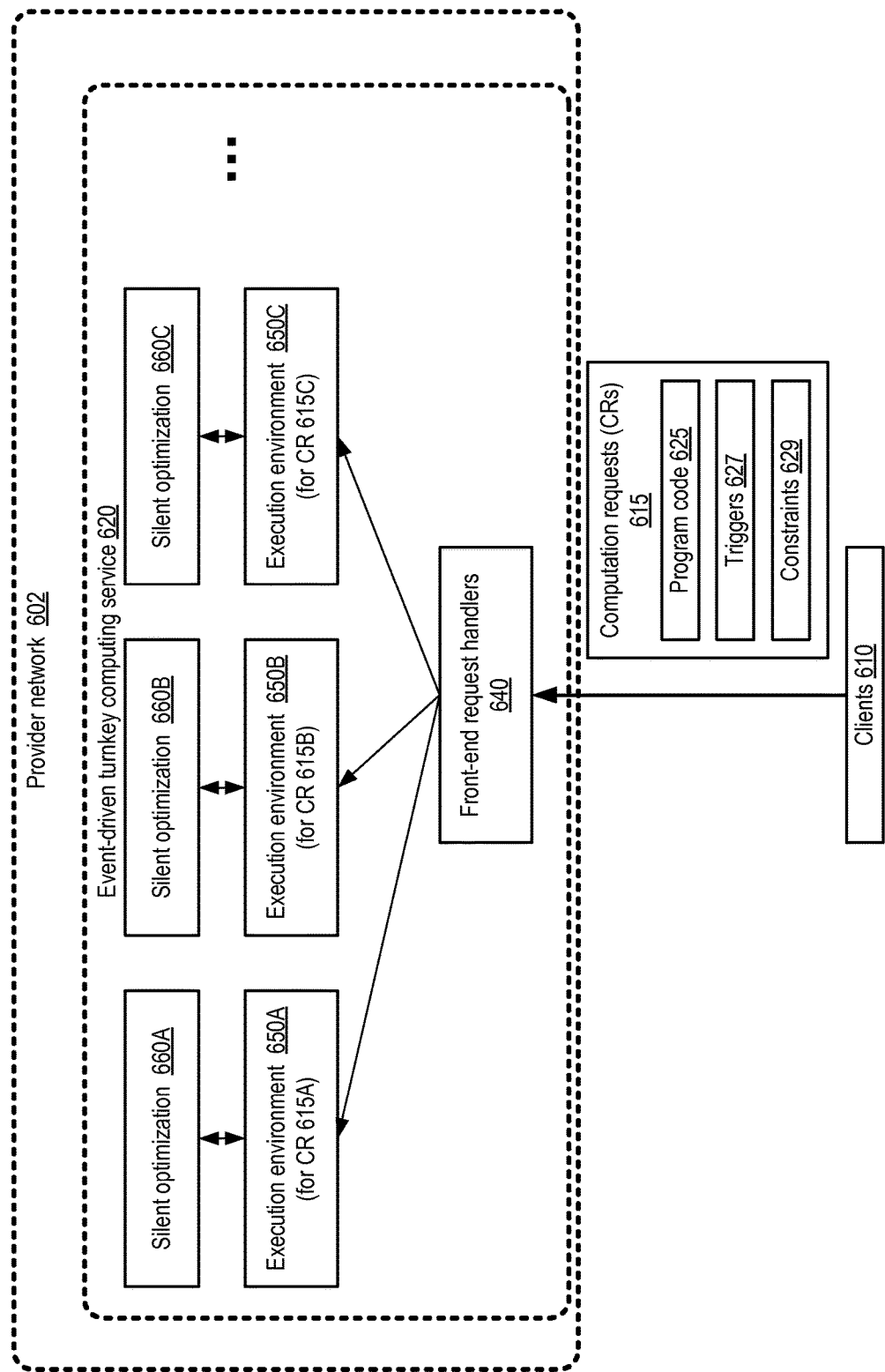
FIG. 6 illustrates an example of GP-based Bayesian optimization for turnkey computing requests at a provider network, according to at least some embodiments.

In at least some embodiments, tunable parameters may be selected for execution environments using GP-based Bayesian techniques without necessarily informing the clients whose applications are being optimized. FIG. 6 illustrates an example of GP-based Bayesian optimization for turnkey computing requests at a provider network, according to at least some embodiments. In the depicted embodiment, an event-driven turnkey computing service 620 is implemented at least in part using resources of a provider network 602. Service 620 may be termed a turnkey service in that clients 610 may submit computation requests 615 without necessarily reserving computing resources ahead of time. The service 620 may select the appropriate resources for the execution environment corresponding to each of the computation requests 615, and initiate the execution of the program code 625 indicated in the computation requests. In the depicted embodiment, one or more front-end request handlers 640 may receive client computation requests 615, e.g., via a network endpoint advertised for the service, and distribute the requested work among respective collections of resources available at service 620. The fulfillment of the client requests may be event-driven in that the client 610 may specify various triggers 627 which impact the computations requested, and the manner in which the triggers affect the execution (e.g., if a particular event E1 is detected at the provider network, the execution may be paused until another event E2 is detected, or if an event E3 is detected, the execution of the computation may be terminated). In the depicted embodiment, a client 610 may also indicate one or more constraints on the execution of the programs 625— e.g., an upper bound on the time of execution may be indicated, or an upper bound on the resource costs may be indicated. In at least some cases, apart from specifying characteristics such as the program code to be executed, the triggers which may control or affect the execution, and constraints, the clients 610 may leave the details of fulfilling the computation requests 615 to the service 620 in the depicted embodiment.

In some cases, a client of the event-driven turnkey computation service 620 may be charged a fixed cost for fulfillment of a given computation request 615. In other cases, the amount the client is charged may be proportional to the resources consumed for the request. In either case, the operator of the provider network 602 may have an incentive to optimize the utilization of various resources of the execution environments 650 (e.g., 650A-650C) being used for service 620. Respective instances of tools implementing the GP-based Bayesian optimization technique may be deployed for each execution environment and each computation request in the depicted embodiment. The optimizations performed may be termed "silent" optimizations 660 (e.g., 660A-660C) in that the clients may not necessarily be made aware that optimizations are being performed for their computation requests. The permissible values or ranges for various tuning variables (such as operating system variables, virtualization-related variables, application server variables and the like) may be determined, for example, based on previous computation requests handled at the service 620, or based on a knowledge base maintained at the provider network 602. Depending on the nature of the computation task requested, the optimization tool assigned to a silent optimization 660 may generate a GP-based Bayesian optimization model and define the boundaries of the observation collection intervals for a given execution environments 650 (e.g., in a manner similar to that shown for continuously-running applications in FIG. 4, or in a manner similar to that shown for batch-mode applications of FIG. 5). For one or more initial observation collection intervals, random selection among the permissible values may be used to select tunable parameter settings; later during the optimization process, the results collected using the randomly-selected values may help to guide the optimization tools towards appropriate values for the parameter settings. The optimization tool may collect execution results for an observation collection interval, use the results to set the model parameters for the next iteration of the model's execution, and use the output parameters of the model to set tunable parameter values for the next observation interval. In at least some cases, within a few iterations of observation collection and model execution, the optimal parameter value settings for the client's computation request may be identified, thereby reducing overall resource consumption and costs. It is noted that random selection of initial tunable values may also be used for some subset of parameters, especially for parameters for which no guidance is available from clients, when the optimization tool is operating in non-silent mode in some embodiments—e.g., for continuously-running applications or for batch mode applications.

Multi-Service Optimization Targets

Figure 7:
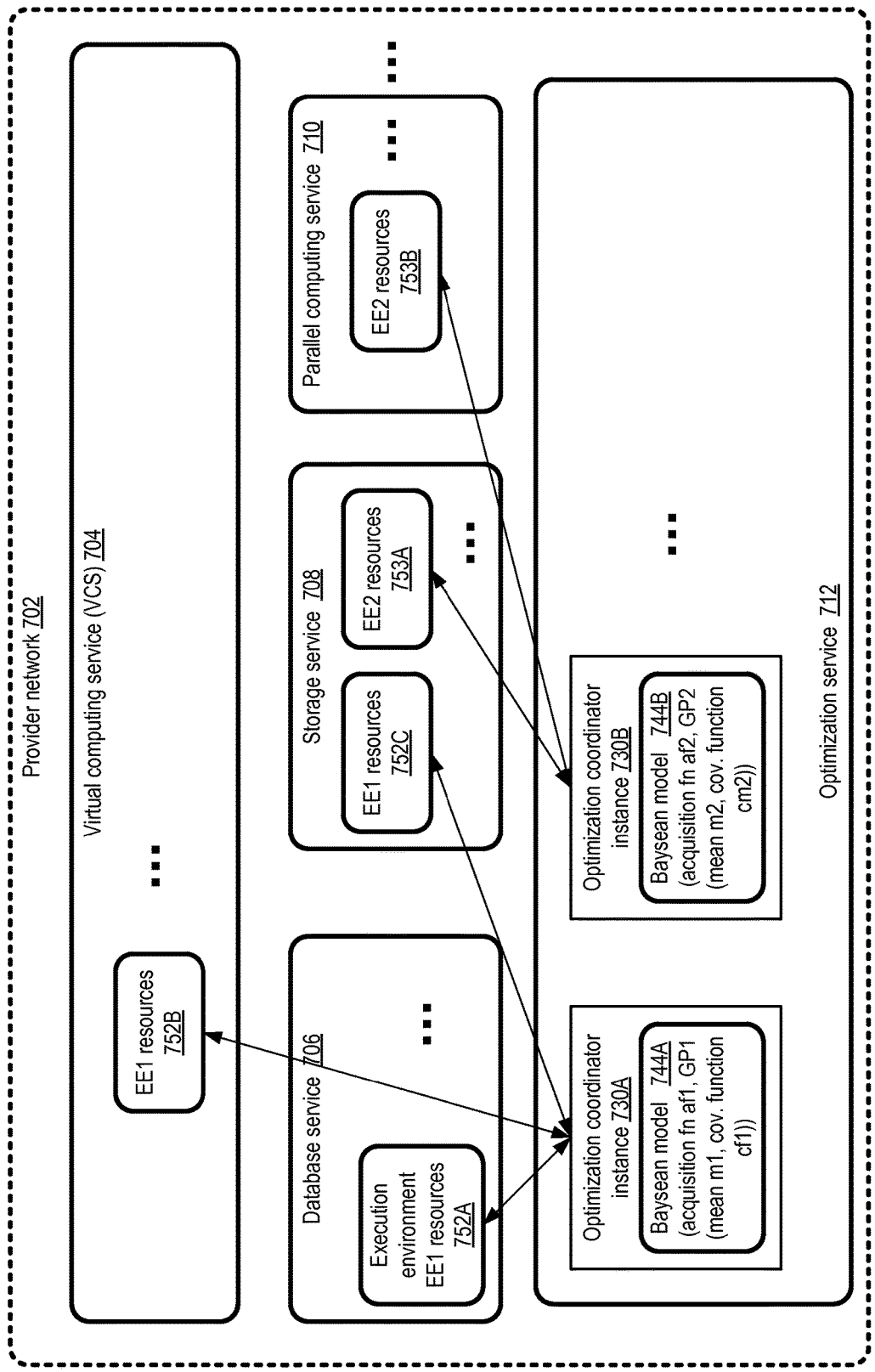
FIG. 7 illustrates example multi-service execution environments at which GP-based Bayesian optimization may be employed, according to at least some embodiments.

FIG. 7 illustrates example multi-service execution environments at which GP-based Bayesian optimization may be employed, according to at least some embodiments. Provider network 702 may include numerous data centers hosting various resource pools, such as collections of physical and/or virtualized computer servers, storage devices, networking equipment and the like, needed to implement, configure and distribute the infrastructure and a plurality of network-accessible services. Within large provider networks, some data centers may be located in different cities, states or countries than others, and in some embodiments the resources allocated to a given application may be distributed among several such locations to achieve desired levels of availability, fault-resilience and performance. The services implemented at provider network 702 in the depicted embodiment may include, for example, a virtual computing service 704, a database service 706, a storage service 708, a parallel computing service 710, and an optimization service 712 which comprises a plurality of optimization coordinator instances 730, such as 730A and 730B. Each of the services may expose respective sets of programmatic interfaces to its clients, and some of the services may utilize resources of other services (for example, the parallel computing service 710 and/or the database service 706 may utilize virtual machines instantiated at the virtual computing service 704 and storage devices provided by the storage service 708).

Individual optimization coordinator instances 730 may be responsible for generating respective GP-based optimization models 744 (e.g., models 744A and 744B) representing execution environments which comprise resources of several different provider network services in the depicted embodiment. Generating the models 744 may include, for example, determining respective acquisition functions such as af1 and af2 for models 744A and 744B, determining statistical properties of the Gaussian processes used for priors at each model such as respective means m1 and m2 and covariance functions cf1 and cf2, and so on. In addition to creating the model, the optimization coordinator instances 730 may also be responsible for orchestrating the collection of results or observations from the execution environments, and/or for applying changes to tunable parameters at the execution environments. Execution environment EE1, which is being used for one or more applications of a particular client may include, for example, resources 752A of database service 706, resources 752B of virtual computing service 704, and resources 752C of storage service 708. As shown, optimization coordinator instance 730A may be responsible for selecting the tunable parameter values for EE1, which may require coordinator 730A to utilize the respective programmatic interfaces exposed by database service 706, virtual computing service 704 and storage service 708 in the depicted embodiment. Similarly, optimization coordinator instance 730B may utilize respective programmatic interfaces of the storage service 708 and the parallel computing service 710 to collect execution results for execution environment EE2 and to modify parameter settings for resources 753A and 753B. In many provider networks, new services may be added over time (e.g., a turnkey event-driven computing service of the kind illustrated in FIG. 6 may be added to provider network 702), and the functionality of existing services may also be enhanced over time. In such scenarios, the optimization coordinators 730 may be designed in an extensible manner, so that they are able to interact with a variety of changing services as needed to orchestrate the process of optimizing tunable parameters for various applications.

Example Elements of Optimization Requests

Figure 8:
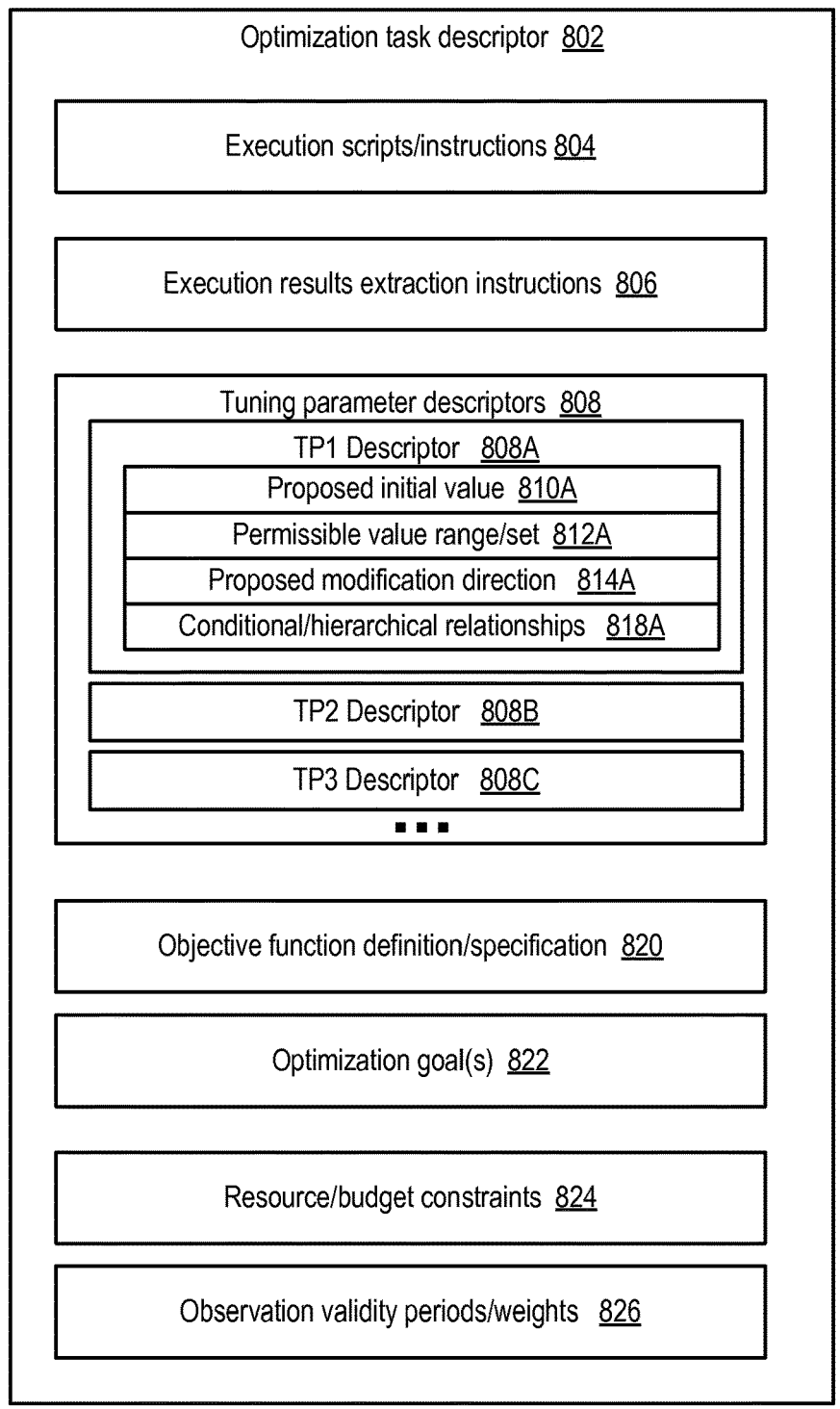
FIG. 8 illustrates example elements of an optimization task descriptor which may be provided by a client of an optimization tool or service, according to at least some embodiments.

In some embodiments, clients may provide guidance to an optimization tool or service regarding various aspects of the techniques to be used for selecting optimal tuning parameters for their execution environments. FIG. 8 illustrates example elements of an optimization task descriptor which may be provided by a client of an optimization tool or service, according to at least some embodiments. An optimization task descriptor 802 may include some combination of execution scripts/instructions 804, results extraction instructions 806, respective descriptors 808 for one or more tuning parameters for which optimal values are to be identified, a definition 820 of an objective function, optimization goals 822, resource or budget constraints 824 with respect to the optimization procedure itself, and/or information about observation validity periods 826. In some embodiments, at least some of the elements of the optimization task descriptor 802 may be provided by a subject matter expert who is knowledgeable about the software components being run, and/or about the hardware components of the execution environment. In one embodiment, at least some of the elements of the optimization task descriptor 802 may be provided by the particular client on whose behalf a given optimization task is to be implemented with respect to a particular execution environment.

Execution scripts or instructions 804 may be used by the optimization tool in embodiments on which the tool is responsible for running the applications whose execution is to be optimized. The instructions may include, for example, the particular credentials required to start or stop an application, network endpoint information which identifies the particular virtual or physical hosts at which the application is to run, and so on. Results extraction instructions 806 may include scripts or commands to be run to gather performance or cost-related metrics during (or at the end of) each observation collection interval. Results extraction instructions may in some cases specify the boundaries or durations of observation collection iterations—for example, the instructions may include the equivalent of "every 12 hours, obtain the current contents of log file <filename>, collect occurrences of log entries containing the phrase 'committed transaction count' and 'failed transaction count', and parse the log entries using the Python script 'parseTransactionResults.py'. In some embodiments, the results extraction instructions 806 may specify triggering conditions for defining observation collection interval boundaries—e.g., the instructions may include the equivalent of "collect the latest response time metrics each time 10,000 new transactions have been completed since the last observation collection iteration ended".

In the depicted embodiment, a given tuning parameter descriptor 808, such as the descriptor 808A for tuning parameter TP1, may include a respective permissible value range or set 812A, a proposed initial value 810A and/or a proposed modification direction 814A. That is, for some tunable parameters the entity which generates optimization task descriptor 802 may provide hints as to the particular values which are considered likely to lead to improved performance, and/or the type of changes (e.g., increase vs. decrease, and the amounts of the increase/decrease) which are considered likely to help performance. In at least some implementations as mentioned above, if no guidance is available regarding the values to be used for a given tunable parameter, an optimization tool may select an initial value (or a few different values for the first few observation collection intervals) using random selection, or based on the contents of a knowledge base as discussed below.

For some types of applications and execution environments, a subset (or all) of the tunable parameters may be related hierarchically or conditionally. For example, if a parameter P1 can take on values A, B, and C, a value for a different parameter P2 may only be meaningful if P1 is set to A, or a value for a parameter P3 may be selected from the range R1 if P1 is set to B and from the range R2 if P1 is set to C, etc. Such conditional/hierarchical relationships 818A among different parameters or among different groups of parameters may be indicated in a tuning parameter descriptor 808 in the depicted embodiment. Information about such relationships may be useful in identifying the properties or elements of a covariance function of the Gaussian process used for the model in some embodiments.

The optimization task descriptor may include a definition or specification 820 of the objective function for which an extremum is to be identified. One or more formulas for computing the objective function may be indicated, e.g., in terms of a non-linear or linear combination of the execution results which can be obtained using extraction instructions 806. An optimization goal 822 may indicate whether the objective function is to be maximized or minimized, or more generally the triggering conditions which are to be used to determine whether the optimization task has been completed successfully. In some embodiments, resource constraints (e.g., expressed in CPU-minutes or CPU-seconds of a particular type of processor or core) and/or budget constraints 824 for the optimization task itself may be indicated in the task descriptor 802. Such constraints may influence or define the optimization goals 822 in some cases—for example, the optimization goal may be specified as the equivalent of "maximize the objective function as far as possible within time T" or "maximize the objective function as far as possible without exhausting budget B".

In at least one embodiment, the relationships between the tuning parameters and the objective function may themselves be time varying. This may occur, for example, if the unit costs of resource consumption or reservation vary dynamically in the execution environment—e.g., if a spot-pricing model or a similar time-varying pricing model is employed. This may also occur if, for example, the amount of work required to fulfill an application request can change substantially based on the size of the input data set of the application, and the size of the input data set increases or decreases over time. In some such scenarios, an optimization task descriptor 802 may include an indication of observation validity periods (or weights) 826, such as the logical equivalent of "do not use observations taken more than X days ago into account in the model" or "discard observations collected during time periods in which the application data set was smaller than 500 GB". Such observation validity periods with respect to performance predictions may be used to trim the accumulated observations used for the GP-based optimization model in at least some embodiments. For example, a given set of observation results may be considered valid for some time after it is collected, and may therefore be incorporated into some number of executions of the model by setting one or more internal model parameters appropriately. If that set of results becomes invalid or less useful with respect to its impact on future performance in view of the observation validity period, those internal model parameters may be adjusted or changed to incorporate the effect of expiration of validity of the results in some embodiments. In some embodiments, instead of excluding execution results completely from model input parameters based on validity expiration, different weights may be assigned to execution results based on how recently the results were collected. Such weights may be used to represent the decreasing significance of older results over time when selecting model input parameter values. For example, results obtained from an observation collection interval OCI1 may be assigned a weight W1, results obtained from an observation collection interval OCI2 which occurred after OCI1 may be assigned a higher weight W2, and so on. Other details regarding the optimization task, such as specifications of the particular hardware devices being used (or available for use) in the execution environment may be included in a descriptor 802 in some embodiments. Some of the elements indicated in the optimization task descriptor shown in FIG. 8 may not be included in some implementations. In various embodiments in which the kinds of information provided by the elements of descriptor 802 are not provided to the optimization tool or service by a client or a subject matter expert, the optimization tool or service may have to generate values for some or all of the information elements on its own. In at least one embodiment, such values may be generated based at least in part on the contents of a knowledge base or results repository of an optimization service. For example, in one embodiment, the initial tunable parameter settings for a particular execution environment comprising a set of software components SC1 may be determined based at least in part on a knowledge base entry which contains information pertaining to a similar set of software components SC2 (and/or a similar execution environment) for which tunable parameter settings were determined earlier. After the initial parameter values are selected using the knowledge base, in at least some cases fewer iterations of the GP-based Bayesian optimization technique may be required to converge to an optimal set of tunable parameter values than if the knowledge base had not been used.

Methods for Optimizing Software Execution Environments

Figure 9:
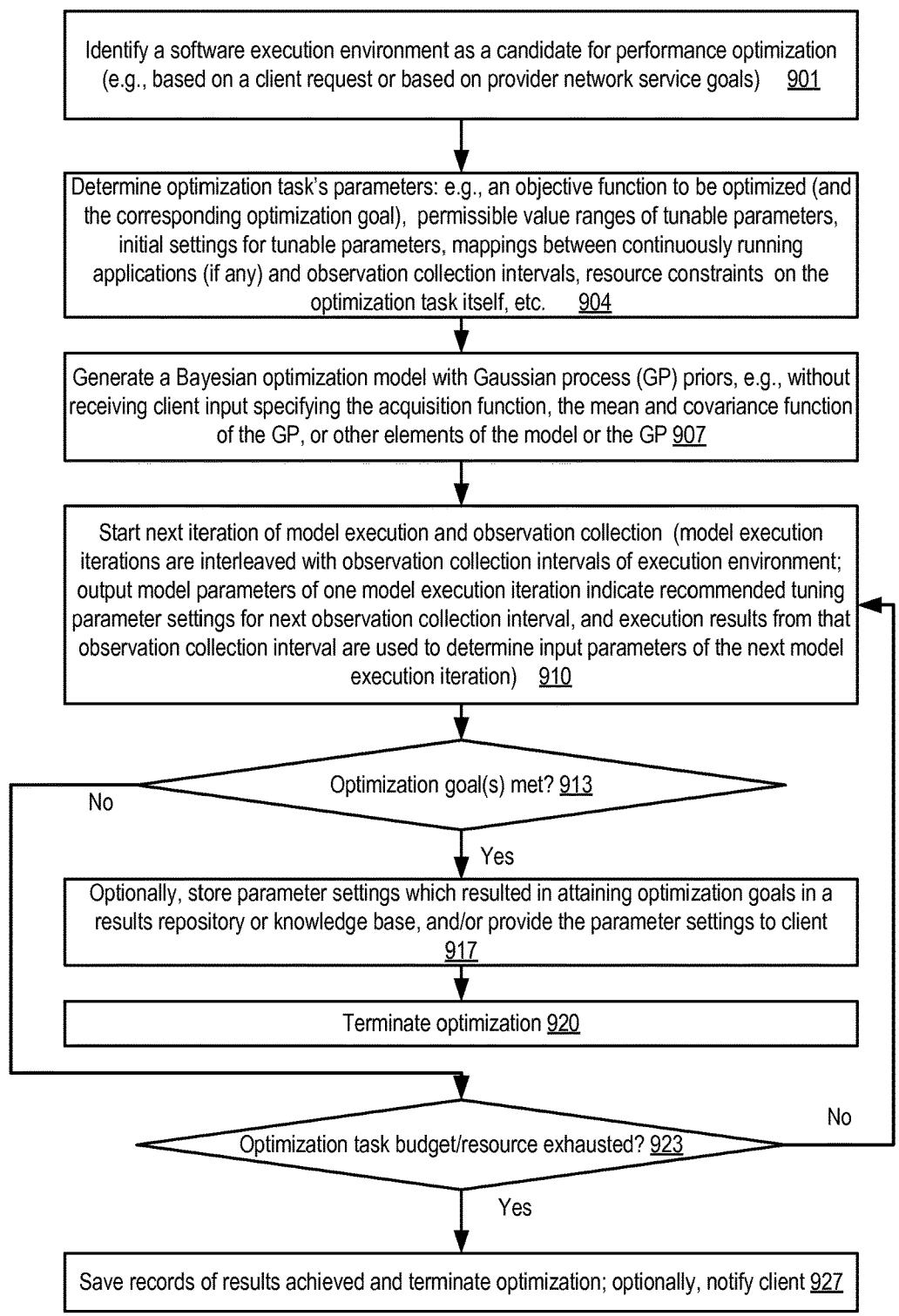
FIG. 9 is a flow diagram illustrating aspects of operations that may be performed to select, using GP-based Bayesian optimization, tuning parameter values for an execution environment, according to at least some embodiments.

FIG. 9 is a flow diagram illustrating aspects of operations that may be performed to select, using GP-based Bayesian optimization, tuning parameter values for an execution environment, according to at least some embodiments. As shown in element 901, an execution environment for one or more software components may be identified as a candidate for performance optimization, e.g., at a hosted optimization service or by a standalone optimization tool. In some cases, a client of the optimization tool or service may specify the execution environment, while in other cases (e.g., when optimization is performed in silent mode), the execution environments may be determined based on provider network service goals. A wide variety of execution environments may be identified as optimization candidates in different embodiments—e.g., the execution environment may comprise a combination of resources of different provider network services, or the set of resources being used for a continuously-running application exposing web service interfaces, or the set of resources being used for a batch-mode application which is typically re-run at selected intervals. Any of various kinds of software applications and the corresponding middleware may run at the execution environment, including for example database applications, parallel computing applications, web servers, application servers, or combinations of such applications.

The parameters of the optimization task to be performed for the execution environment selected as the optimization candidate may be determined (element 904). The objective function for which an optimal value is to be found may be identified—that is, the manner in which an objective function's value is to be computed based on one or more raw execution results such as throughput, average or percentile-based response times, resource reservation costs, and the like may be determined. In at least some cases, the objective function may depend on multiple execution result metrics, and the relationships between the objective function and the execution results may be non-linear. The goal for the optimization may be identified—e.g., whether a maximum or a minimum value is to be obtained for the objective function, and the exactness or precision associated with the attainment of the goal may be determined. A list of tunable parameters to be included in the optimization procedure, and the permissible value ranges or discrete sets of permissible values for various tunable parameters may be identified. A wide variety of tunable parameters may be amenable for GP-based Bayesian optimization in different embodiments, at various levels of the hardware/software stacks used in the execution environments. Examples of such parameters in various embodiments may include a garbage collection algorithm to be used for memory management, a minimum or maximum size of a memory to be allocated for a heap managed using the garbage collection algorithm, various networking configuration parameters associated with networking protocols being used, the number of nodes to be included in a collection of nodes implementing a distributed application, database configuration parameters such as buffer pool sizes, hypervisor configuration parameters, or storage device configuration parameters.

In some embodiments in which the optimization tool or service is responsible for executing the software components for one or more observation collection intervals, the initial values to be used for various tunable parameters may be identified. The boundaries (e.g., start times and end times) for various observation collection intervals may be identified, e.g., in an execution environment in which the software components run continuously, a mapping between the continuously running application and discrete sets of observations of execution results may have to be determined. Resource constraints on the optimization task itself (if any) may also be identified in some embodiments in operations corresponding to element 904. In some embodiments, at least some of the optimization task's parameters may be indicated via programmatic interfaces by clients on whose behalf the execution environment is established, and on whose behalf the optimization task is being performed. In other embodiments, the optimization tool or service may receive little or no specific input from clients, and may have to identify at least an initial set of optimization task parameters without guidance from clients.

A Bayesian optimization model to represent the execution environment may be generated, in which Gaussian process priors are utilized (element 907). The generation of the model may involve a number of steps, such as identifying the mean and covariance function for the Gaussian process, identifying an acquisition function, and so on. In the depicted embodiment, the model parameters may be determined without requiring any statistics-related expertise or model generation-related input from the client. In some embodiments, the client may not even be aware that an execution environment is being optimized, and/or that GP-based Bayesian optimization is being used. From the perspective of a client, in some embodiments the optimization service or tool may appear to be the equivalent of a black box which automatically analyzes the execution results of the client's application and provides recommendations for tunable parameter settings.

A number of iterations of model execution may be performed, interleaved with the collection of metrics from the execution environment, with tunable parameters of the execution environment set based on the output parameters of a previous model execution iteration (element 910). Input parameters for a given model iteration may be based at least in part on execution results (and the corresponding objective function value) from the precious observation collection period or "experiment". As noted earlier, in at least some embodiments the workload or data set may change from one observation collection interval to the next, and as a result perfect repeatability of the observed environment may not be feasible. After each observation collection, a determination may be made as to whether the targeted optimization objective (e.g., the maximum or minimum of the objective function) has been attained. Of course, as with various other optimization techniques, a guarantee that the GP-based Bayesian approach will find the global minimum or maximum within a specified number of iterations may not be provided; however, in practice, GP-based Bayesian approaches have been shown to be efficient in identifying global extrema.

If a determination is made after an observation collection interval that the desired optimization goal has been met (as determined in element 913), the tunable parameter settings which led to the attainment of the goal may optionally be saved to a persistent storage repository or knowledge base in some embodiments (element 917). In some cases the client on whose behalf the optimization task was being implemented may be notified regarding the optimal tunable parameter values. The optimization task may then be terminated (element 920) in the depicted embodiment. If the optimization goal is not met (as also detected in element 913), and the resource or budget limits for the optimization task have been exhausted (as determined in element 923), the results and parameters of the latest execution and observation collection iteration may be saved in some embodiments before terminating or abandoning the optimization procedure. If the resource limits for the optimization task have not been exhausted (as also determined in element 923), another iteration of model execution and observation collection may be scheduled (element 910) in the depicted embodiment.

It is noted that in various embodiments, some of the operations shown in FIG. 9 may be implemented in a different order than that shown in the figure, or may be performed in parallel rather than sequentially. Additionally, some of the operations shown in FIG. 9 may not be required in one or more implementations. In some embodiments, for example, the interleaved iterations of model execution and observation collection may continue indefinitely, e.g., to confirm whether the optimal parameter settings continue to remain optimal over time for a continuously running service, so the optimization task may not have to be terminated as long as the execution environment remains operational.

Use Cases

The techniques described above, of automatically generating a Bayesian optimization model with Gaussian process priors to select appropriate values of tunable parameters for software execution environments, may be useful in a variety of scenarios. Especially in provider network environments, the number of different service components involved in implementing a given application may be so large that assembling the experts capable of tuning the application as a whole may become difficult. Even for relatively small execution environments such as a single virtual machine whose memory management tunable values have to be identified, the relationship between tunable parameters and performance results may be complex enough to make performance optimization a resource-intensive affair. An optimization service or tool which is able to orchestrate the execution of diverse software components, the collection of execution results, and the selection of tunable parameters automatically, without requiring statistical expertise from the clients, may lead to substantial improvements in performance and cost for complex applications.

Illustrative Computer System

Figure 10:
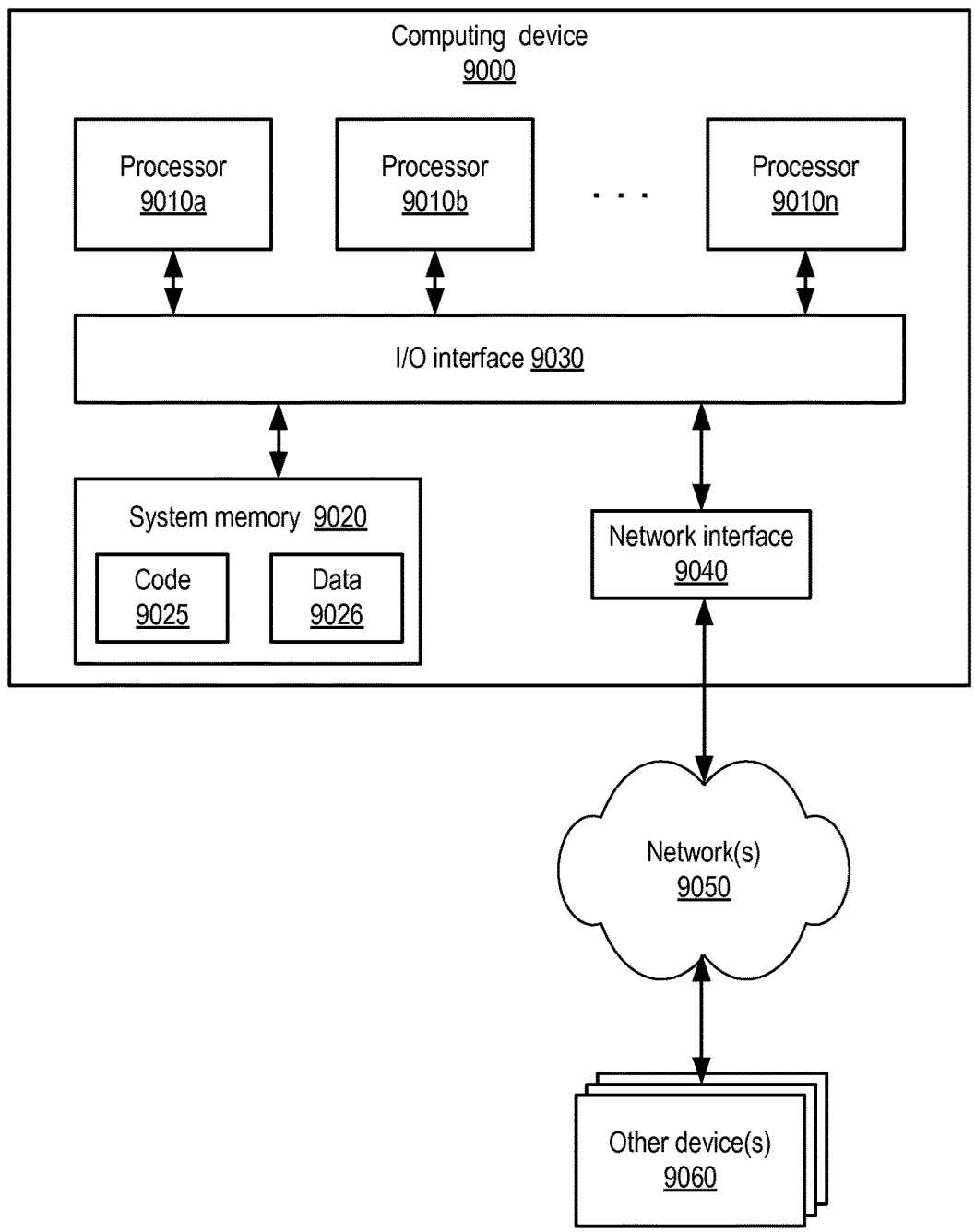
FIG. 10 is a block diagram illustrating an example computing device that may be used in at least some embodiments.

In at least some embodiments, a server that implements one or more of the techniques described above for automated tuning of software execution environments, including various optimization tools or other components of an optimization service, may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of an optimization service implemented at a provider network;
wherein the one or more computing devices are configured to:
identify, as a candidate for performance optimization, an execution environment comprising one or more software components, wherein the execution environment has a plurality of tunable parameters, and wherein at least one software component of the one or more software components is instantiated at a particular computing resource of the provider network;
receive, based at least in part on input via a programmatic interface from a client on whose behalf the execution environment is configured, (a) a definition of an objective function that specifies a non-linear transformation of one or more execution results produced by the one or more software components to produce one or more objective function values to be optimized, and (b) a respective plurality of permissible settings for at least a first tunable parameter and a second tunable parameter of the plurality of tunable parameters;
generate, corresponding to the execution environment, a Bayesian model using Gaussian process priors, wherein input to the Bayesian model includes the one or more objective function values and output of the Bayesian model includes settings for at least the first and second tunable parameters;
perform a plurality of iterations of execution of the Bayesian model, including a first iteration and a second iteration, wherein input model parameters for the second iteration are determined based at least in part on an evaluation of the objective function over a set of execution results obtained from the execution environment, wherein the set of execution results are obtained using settings indicated for at least the first and second tunable parameters in output model parameters produced by the first iteration; and
in response to a determination that an optimization goal corresponding to the execution environment has been attained according to the objective function, store settings of at least the first and second tunable parameters which correspond to attainment of the optimization goal.

2. The system as recited in claim 1, wherein the one or more software components include a first application, wherein the first application implements a web service interface to receive client requests generated outside the provider network, wherein the one or more computing devices are configured to:
select a start time and an end time of a first observation collection interval of the first application corresponding to the first iteration of execution of the Bayesian model, wherein the input model parameters for the second iteration are based at least in part on execution results obtained from the first application during the first observation collection interval, and wherein the first application remains online during a time period which begins prior to the start time and ends later than the end time.

3. The system as recited in claim 1, wherein the one or more software components include a first application which is executed in batch mode, wherein a data set of a first batch iteration of the first application differs from a data set of a second batch iteration of the first application, wherein the one or more computing devices are configured to:
collect a first set of execution results corresponding to the first batch iteration of the first application;
generate input model parameters for the first iteration of execution of the Bayesian model based at least in part on the first set of execution results;
modify a setting of the first tuning parameter setting prior to the second batch iteration of the first application, based at least in part on output parameters of the first iteration of execution of the Bayesian model;
collect a second set of execution results corresponding to the second batch iteration of the first application; and
generate input model parameters for the second iteration of execution of the Bayesian model based at least in part on the second set of execution results.

4. The system as recited in claim 1, wherein the one or more computing devices are configured to:
receive, from the client via the programmatic interface, an indication of a conditional relationship between the first tunable parameter and a third tunable parameter of the plurality of tunable parameters; and
determine a covariance function of the Gaussian process based at least in part on the conditional relationship.

5. The system as recited in claim 1, wherein the one or more computing devices are configured to:
determine, based at least in part on an observation validity period associated with the execution environment, that a particular execution result obtained from the execution environment is no longer valid with respect to predicting performance; and
modify, to incorporate an effect of expiration of validity of the particular execution result, one or more parameters of the Bayesian model.

6. A method, comprising:
performing, by a network-accessible optimization tool implemented using one or more computing devices:
identifying, as a candidate for performance optimization, an execution environment comprising one or more software components, wherein the execution environment has a plurality of tunable parameters;
receiving, from a client, (a) a definition of an objective function that specifies a non-linear transformation of one or more execution results produced by the one or more software components to produce as output one or more objective function values to be optimized and (b) a respective plurality of permissible settings for at least a first tunable parameter and a second tunable parameter of the plurality of tunable parameters;
generating, with respect to the execution environment, a Bayesian model employing a Gaussian process, wherein input to the Bayesian model includes the one or more objective function values and output of the Bayesian model includes settings for at least the first and second tunable parameters;
implementing a plurality of iterations of execution of the Bayesian model, including a first iteration and a second iteration, wherein input model parameters for the second iteration are determined based at least in part on an evaluation of the objective function over a set of execution results obtained from the execution environment, wherein the set of execution results is obtained using settings indicated for at least the first and second tunable parameters in output model parameters of the first iteration; and
in response to determining that an optimization goal associated with the execution environment has been attained according to the objective function, storing an indication of settings for at least the first and second tunable parameters which correspond to an attainment of the optimization goal.

7. The method as recited in claim 6, wherein the one or more software components include a first application executing at one or more computing devices of a provider network, wherein the first application implements a programmatic interface to receive client requests, further comprising performing, by the network-accessible optimization tool:
determining a start time and an end time of a first observation collection interval of the first application corresponding to the first iteration of execution of the Bayesian model, wherein the input model parameters for the second iteration of the plurality of iterations are based at least in part on execution results obtained from first application during the first observation collection interval.

8. The method as recited in claim 7, wherein the first application is a distributed application executing at a plurality of computing devices of the provider network, wherein the first tunable parameter comprises a first configuration setting of a particular computing device of the plurality of computing devices, further comprising:
modifying, by the network-accessible optimization tool, the first configuration setting for a second observation collection interval of the first application, without modifying a corresponding configuration setting of another device of the plurality of computing devices for the second observation collection interval.

9. The method as recited in claim 6, wherein the one or more software components include a first application which is executed iteratively in batch mode, wherein a data set of a first batch iteration of the first application differs from a data set of a second batch iteration of the first application, further comprising performing, by the network-accessible optimization tool:
collecting a first set of execution results corresponding to the first batch iteration of the first application;
generating input model parameters for the first iteration of execution of the Bayesian model based at least in part on the first set of execution results; and
modifying the first tuning parameter setting prior to the second batch iteration of the first application, based at least in part on output parameters of the first iteration of execution of the Bayesian model.

10. The method as recited in claim 6, wherein generating the Bayesian model employing a Gaussian process comprise determining a mean and covariance function for the Gaussian process.

11. The method as recited in claim 6, further comprising performing, by the network-accessible optimization tool:
receiving, from the client via a programmatic interface, an indication of at least one permissible setting for the first tunable parameter.

12. The method as recited in claim 6, further comprising performing, by the network-accessible optimization tool:

receiving, from the client via a programmatic interface, an indication of a conditional relationship between the first tunable parameter and a third tunable parameter of the plurality of tunable parameters; and setting a particular parameter of the Gaussian process based at least in part on the conditional relationship.

13. The method as recited in claim 6, further comprising performing, by the network-accessible optimization tool:

determining, with respect to performance prediction, an observation validity period associated with the execution environment; and adjusting, prior to a particular iteration of execution the Bayesian model, one or more model parameters of the Bayesian model based at least in part on the observation validity period.

14. The method as recited in claim 6, wherein the first tunable parameter comprises one or more of: (a) a garbage collection algorithm to be used for memory management, (b) a size of a memory to be allocated, (c) a networking configuration parameter, (d) a number of nodes to be included in a collection of nodes implementing a distributed application, (e) a database configuration parameter, (f) a hypervisor configuration parameter, or (g) a storage device configuration parameter.

15. The method as recited in claim 6, wherein the execution environment is configured on behalf of a particular client of a network-accessible service, further comprising, performing, by the network-accessible optimization tool;

applying, in the execution environment, the settings indicated for at least the first and second tunable parameters in the output model parameters of the selected iteration, without notifying the particular client that the Bayesian model was used to determine the settings.

16. A non-transitory computer-accessible storage medium storing program instructions that when executed on one or more processors:

receiving, from a client, (a) a definition of an objective function that a non-linear transformation of one or more execution results produced by one or more software components in an execution environment to produce as output one or more objective function values to be optimized and (b) a respective plurality of permissible settings for at least a first tunable parameter and a second tunable parameter of a plurality of tunable parameters of the execution environment;

generate, with respect to the execution environment, a Bayesian model employing a Gaussian process, wherein input to the Bayesian model includes the one or more objective function values and output of the Bayesian model includes settings for at least the first and second tunable parameters;

implement a plurality of iterations of execution of the Bayesian model, including a first iteration and a second iteration, wherein input model parameters for the second iteration are determined based at least in part on an evaluation of the objective function over a set of execution results obtained from the execution environment, wherein the set of execution results is obtained using settings indicated for at least the first and second tunable parameters in output model parameters of the first iteration; and store an indication of settings indicated for at least the first and second tunable parameters in output model parameters of a selected iteration of the plurality of iterations of execution.

17. The non-transitory computer-accessible storage medium as recited in claim 16, wherein to implement a particular iteration of the plurality of iterations of execution of the Bayesian model, the instructions when executed on the one or more processors:

evaluate an acquisition function which models a relationship between at least some tunable parameters of the plurality of tunable parameters and the objective function, without providing an indication of the acquisition function to a particular client on whose behalf the execution environment is configured, and without receiving an indication of the acquisition function from the particular client.

18. The non-transitory computer-accessible storage medium as recited in claim 16, wherein the one or more software components include a first application executing at one or more computing devices of a provider network, wherein the first application implements a programmatic interface to receive client requests, wherein the instructions when executed on one or more processors:

collect, from the execution environment, respective sets of execution results corresponding to a first observation collection interval of the first application and a second observation collection interval of the first application, wherein the first observation collection interval does not overlap with the second observation collection interval, and wherein the first application remains in operation continuously between a start of the first observation collection interval and an end of the second observation collection interval.

19. The non-transitory computer-accessible storage medium as recited in claim 16, wherein the instructions when executed on the one or more processors:

select, prior to a particular observation collection interval corresponding to the one or more software components, a particular permissible setting for the first tunable parameter based at least in part on one or more of: (a) a random selection from among the plurality of permissible settings of the first tunable parameter, (b) programmatic input received from the client, or (c) contents of a knowledge base.

20. The non-transitory computer-accessible storage medium as recited in claim 16, wherein the instructions when executed on the one or more processors:

determine a conditional relationship between the first tunable parameter and a third tunable parameter of the plurality of tunable parameters; and set a particular parameter of the Bayesian model based at least in part on the conditional relationship.

21. The non-transitory computer-accessible storage medium as recited in claim 16, wherein the plurality of iterations of execution of the Bayesian model include a third iteration performed after the first iteration and after the second iteration, wherein the instructions when executed on the one or more processors:

assign a first weight to a particular execution result obtained using the settings indicated for at least the first and second tunable parameters in the output model parameters of the first iteration, wherein the first weight is based at least in part on an amount of time elapsed since the particular execution result was obtained from the execution environment;

assign a different weight to a different execution result obtained using settings indicated for at least the first and second tunable parameters in the output model parameters of the second iteration, wherein the different weight is based at least in part on an amount of time elapsed since the different execution result was obtained from the execution environment; and determine the input model parameters for the third iteration based at least in part on the first weight and the second weight.

\* \* \* \* \*